United States Patent
Lee et al.

(10) Patent No.: US 8,478,928 B2
(45) Date of Patent: Jul. 2, 2013

(54) DATA STORAGE DEVICE AND INFORMATION PROCESSING SYSTEM INCORPORATING DATA STORAGE DEVICE

(75) Inventors: Tae Hack Lee, Yongin-si (KR); Sang Kyoo Jeong, Seoul (KR); Myung Hyun Jo, Seoul (KR); Chan Ik Park, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 423 days.

(21) Appl. No.: 12/764,464

(22) Filed: Apr. 21, 2010

(65) Prior Publication Data

US 2010/0274953 A1  Oct. 28, 2010

(30) Foreign Application Priority Data

Apr. 23, 2009 (KR) .......... 10-2009-0035602
Jun. 18, 2009 (KR) .......... 10-2009-0054512

(51) Int. Cl.
*G06F 12/00* (2006.01)
(52) U.S. Cl.
USPC ............... 711/103; 711/157; 711/E12.001; 713/300

(58) Field of Classification Search
USPC ...... 711/103, 154, 118, E12.001, 157; 713/1, 713/2, 100, 300, 324; 455/127.1; 365/189.11
See application file for complete search history.

(56) References Cited

U.S. PATENT DOCUMENTS

| | | | |
|---|---|---|---|
| 5,724,592 A | 3/1998 | Garner | |
| 2007/0030741 A1* | 2/2007 | Nii et al. | 365/189.11 |
| 2007/0093220 A1* | 4/2007 | Choi et al. | 455/127.1 |
| 2009/0249102 A1* | 10/2009 | Yong et al. | 713/324 |
| 2012/0072664 A1* | 3/2012 | Higaki et al. | 711/114 |

FOREIGN PATENT DOCUMENTS

| | | | |
|---|---|---|---|
| JP | 2000132283 A | | 5/2000 |
| JP | 2005078514 A | | 3/2005 |
| KR | 1020070096182 A | | 10/2007 |
| KR | 1020070112660 A | | 11/2007 |
| KR | 1020080071333 A | | 8/2008 |
| WO | 2006051779 A1 | | 5/2006 |

* cited by examiner

*Primary Examiner* — Pierre-Michel Bataille
(74) *Attorney, Agent, or Firm* — Volentine & Whitt, PLLC

(57) ABSTRACT

A data storage device comprises a plurality of memory devices and a memory controller. The memory controller exchanges data with the memory devices via a plurality of channels. The memory controller decodes an external command to generate a driving power mode and accesses the memory devices according to the driving power mode.

9 Claims, 27 Drawing Sheets

(n=8 channels, m=8 memory devices per group)

| P_mode | Description | |
|---|---|---|
| | Activated CH/Way | Remarks |
| 000 | 8CH / 8Way | Full power mode |
| 001 | 4CH / 4Way | Half power mode |
| 010 | 2CH / 2Way | Quarter power mode |
| 011 | 1CH / 1Way | Minimum power mode |
| 100 | Reserved | |
| 101 | | |
| 110 | | |
| 111 | | |

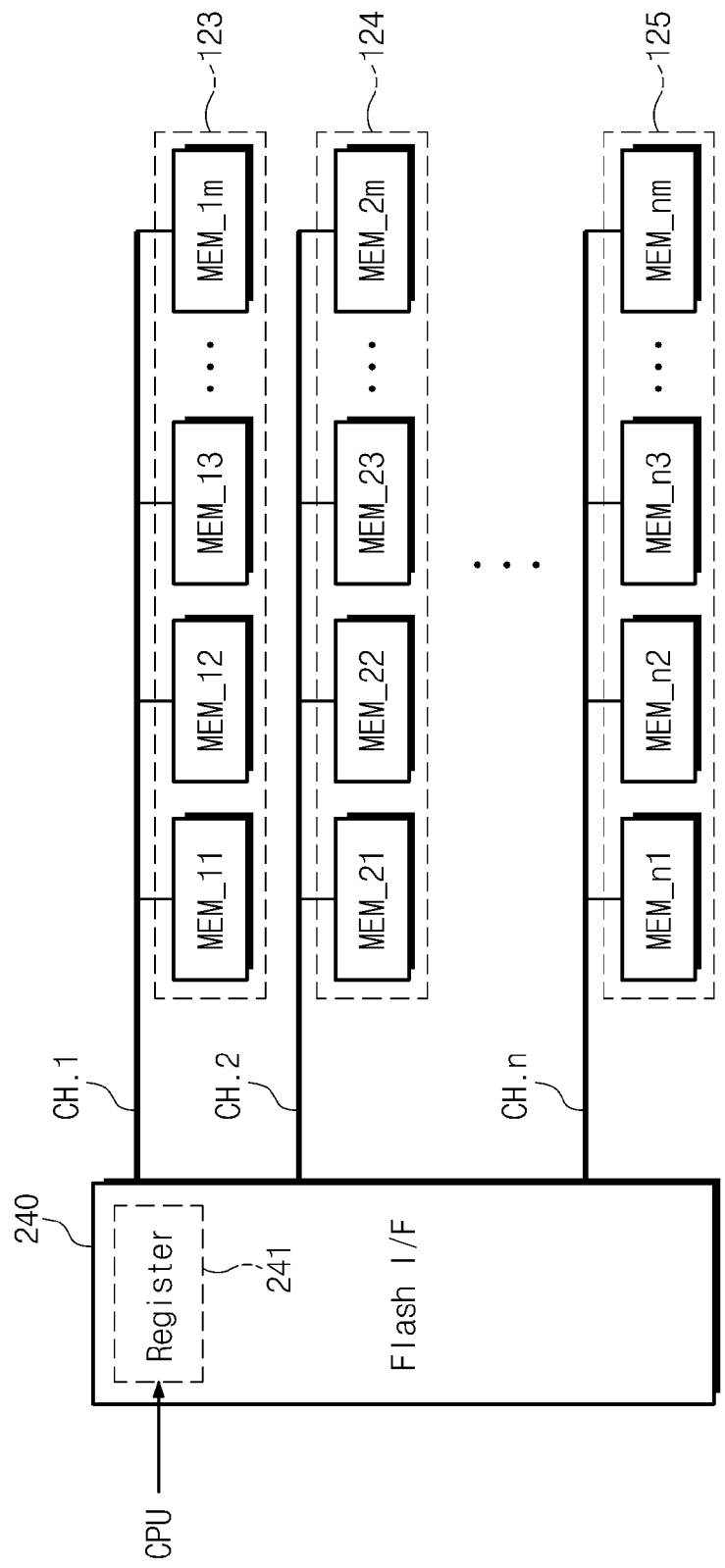

Fig. 4A (n=8 channels, m=8 memory devices per group)

| P_mode | Description | |
|---|---|---|
| | Activated CH/Way | Remarks |
| 000 | 8CH / 8Way | Full power mode |
| 001 | 4CH / 4Way | Half power mode |
| 010 | 2CH / 2Way | Quarter power mode |
| 011 | 1CH / 1Way | Minimum power mode |

Fig. 4B (n=8 channels, m=8 memory devices per group)

| P_mode | Description | | |
|---|---|---|---|
| | CLK frequency | Activated CH/Way | Remarks |
| 000 | $f_b, f_c, f_i$ | 8CH / 8Way | PM0 (Full power mode) |
| 001 | | 4CH / 4Way | PM1 |
| 010 | | 2CH / 2Way | PM2 |
| 011 | | 1CH / 1Way | PM3 |
| 100 | $f_b/2, f_c/2, f_i/2$ | 8CH / 8Way | PM0' |
| 101 | | 4CH / 4Way | PM1' |
| 110 | | 2CH / 2Way | PM2' |
| 111 | | 1CH / 1Way | PM3' (Minimum power mode) |

\* $f_b$ : Buffer memory clock frequency
\* $f_c$ : CPU clock frequency
\* $f_i$ : Flash channel clock frequency

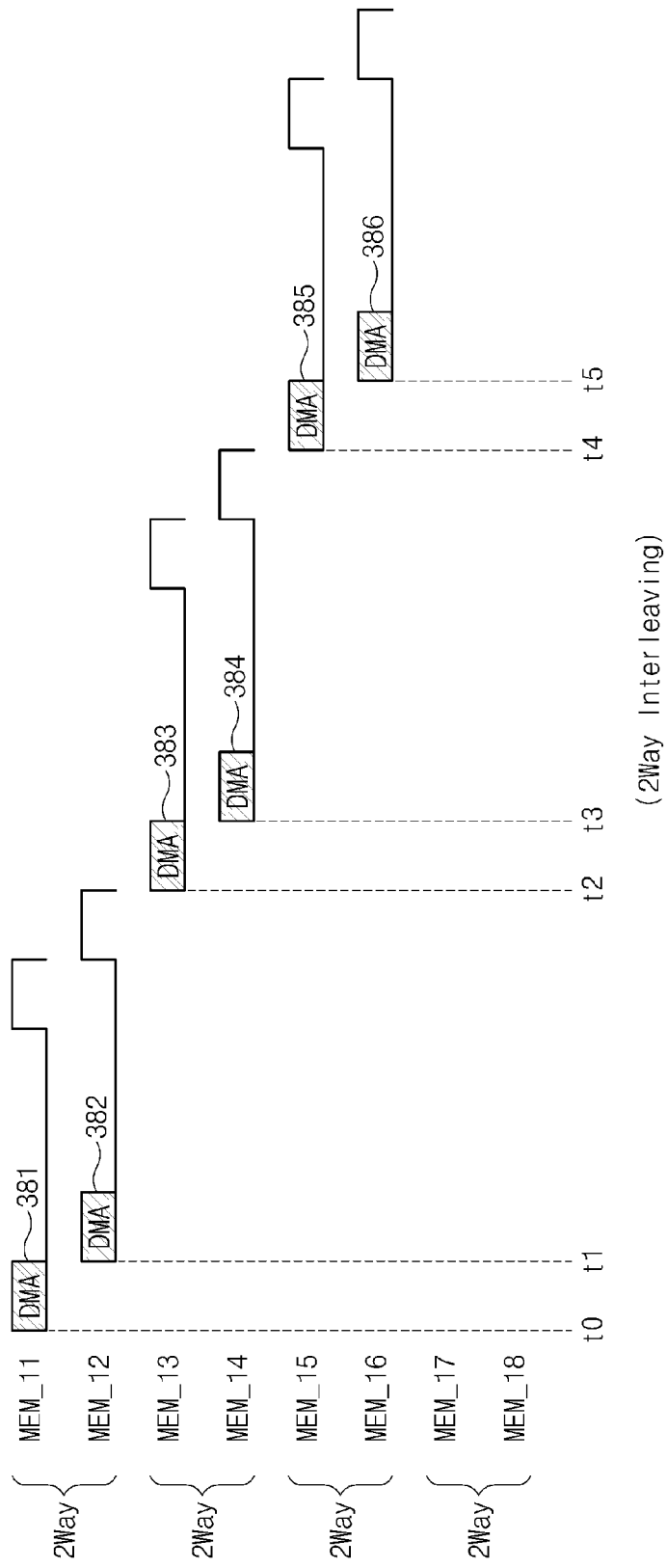

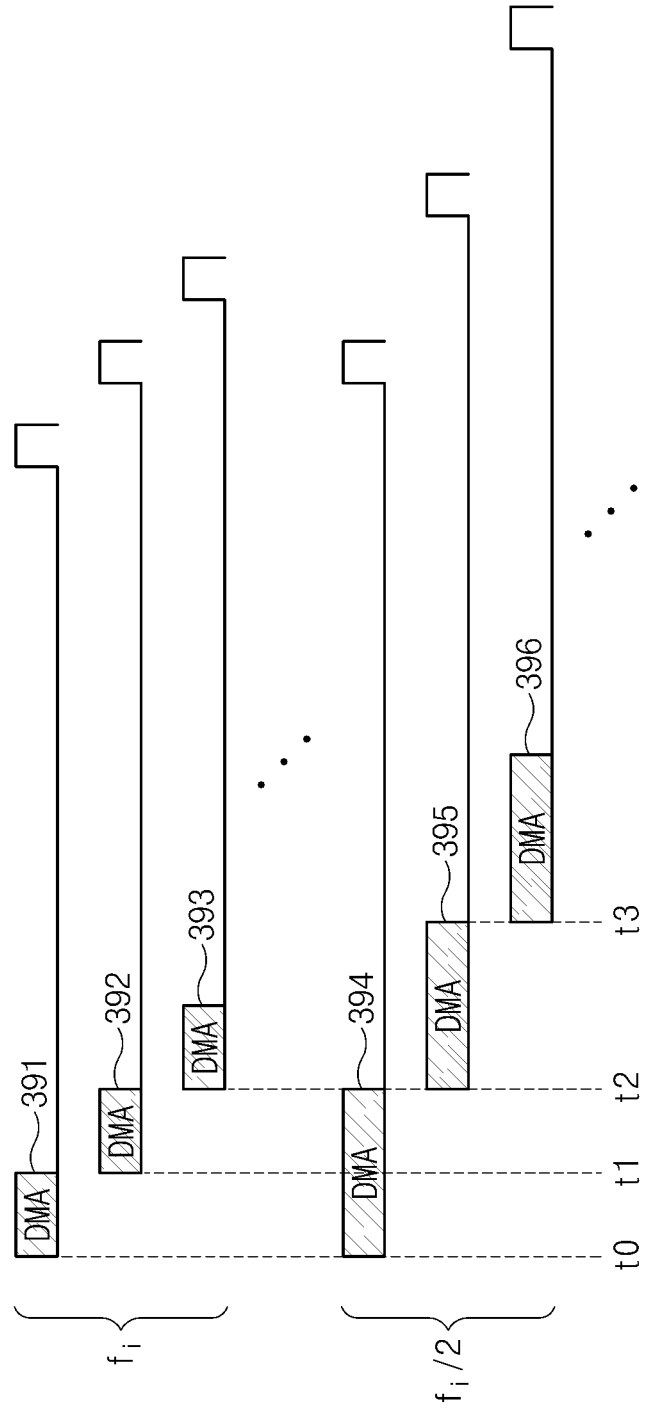

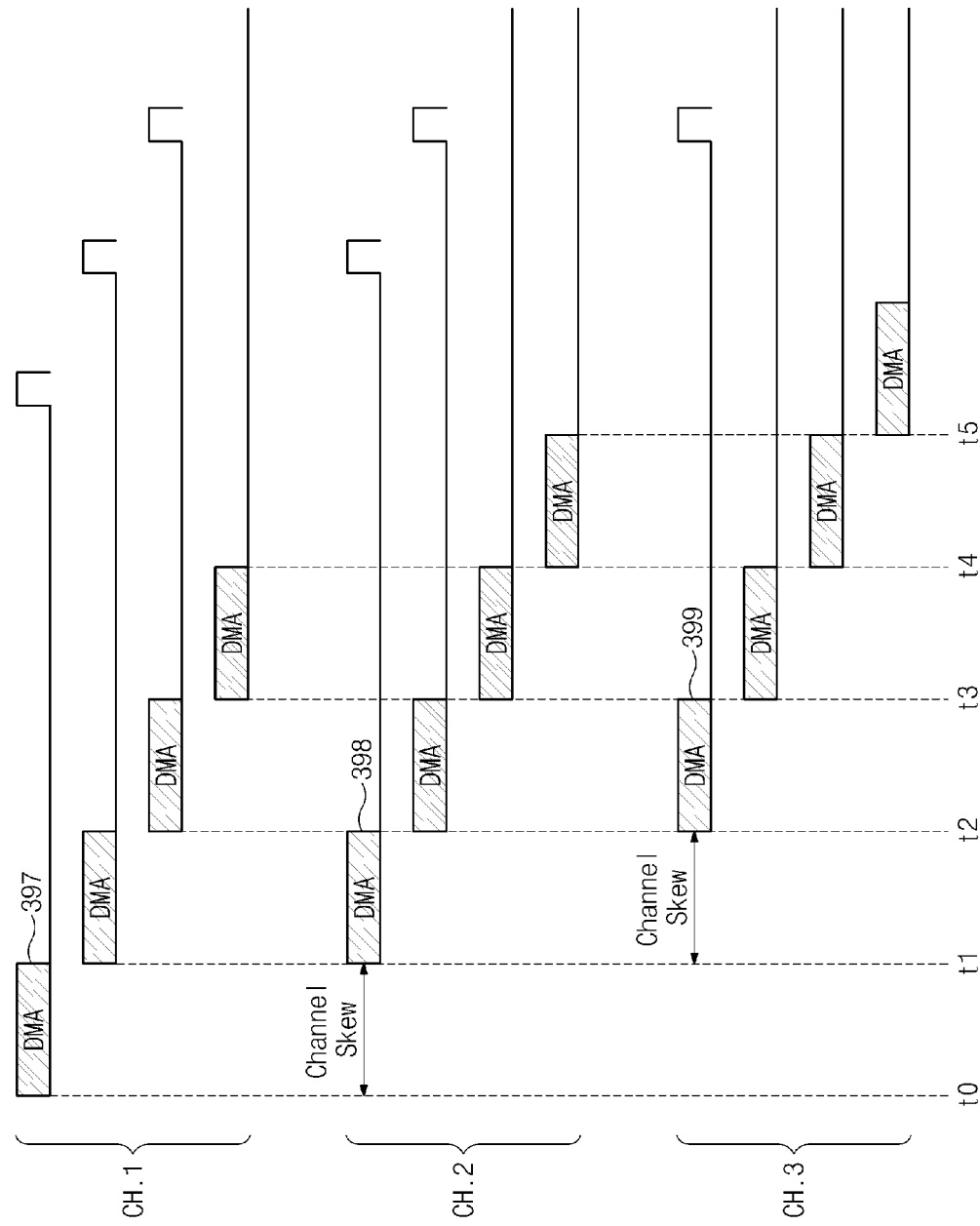

(n=8 channels, m=8 memory devices per group)

| P_mode | Description | |
|---|---|---|
| | Activated CH/Way | Remarks |
| 000 | 8CH / 8Way | Full power mode |
| 001 | 4CH / 4Way | Half power mode |
| 010 | 2CH / 2Way | Quarter power mode |
| 011 | 1CH / 1Way | Minimum power mode |
| 100 | Reserved | |
| 101 | | |
| 110 | | |
| 111 | | |

Fig. 14B (n=8 channels, m=8 memory devices per group)

| P_mode | Description ||
| --- | --- | --- |
| | Activated CH/Way | Remarks |
| 0000 | 8CH / 8Way | Full power mode (PM0) |
| 0001 | 8CH / 4Way | PM1 |
| 0010 | 8CH / 2Way | PM2 |
| 0011 | 8CH / 1Way | PM3 |
| 0100 | 4CH / 8Way | PM4 |
| 0101 | 4CH / 4Way | PM5 |
| 0110 | 4CH / 2Way | PM6 |
| 0111 | 4CH / 1Way | PM7 |
| 1000 | 2CH / 8Way | PM8 |
| 1001 | 2CH / 4Way | PM9 |
| 1010 | 2CH / 2Way | PM10 |
| 1011 | 2CH / 1Way | PM11 |
| 1100 | 1CH / 8Way | PM12 |
| 1101 | 1CH / 4Way | PM13 |
| 1110 | 1CH / 2Way | PM14 |
| 1111 | 1CH / 1Way | Minimum power mode (PM15) |

Fig. 14C (n=8 channels, m=8 memory devices per group)

| P_mode | Description | | |
|---|---|---|---|
| | CLK frequency | Activated CH/Way | Remarks |
| 000 | $f_0$ | 8CH / 8Way | PM0 (Full power mode) |
| 001 | | 4CH / 4Way | PM1 |
| 010 | | 2CH / 2Way | PM2 |
| 011 | | 1CH / 1Way | PM3 |
| 100 | $f_0/2$ | 8CH / 8Way | PM0' |
| 101 | | 4CH / 4Way | PM1' |
| 110 | | 2CH / 2Way | PM2' |
| 111 | | 1CH / 1Way | PM3' (Minimum power mode) |

\* CLK: Buffer memory or CPU or Flash channel clock.

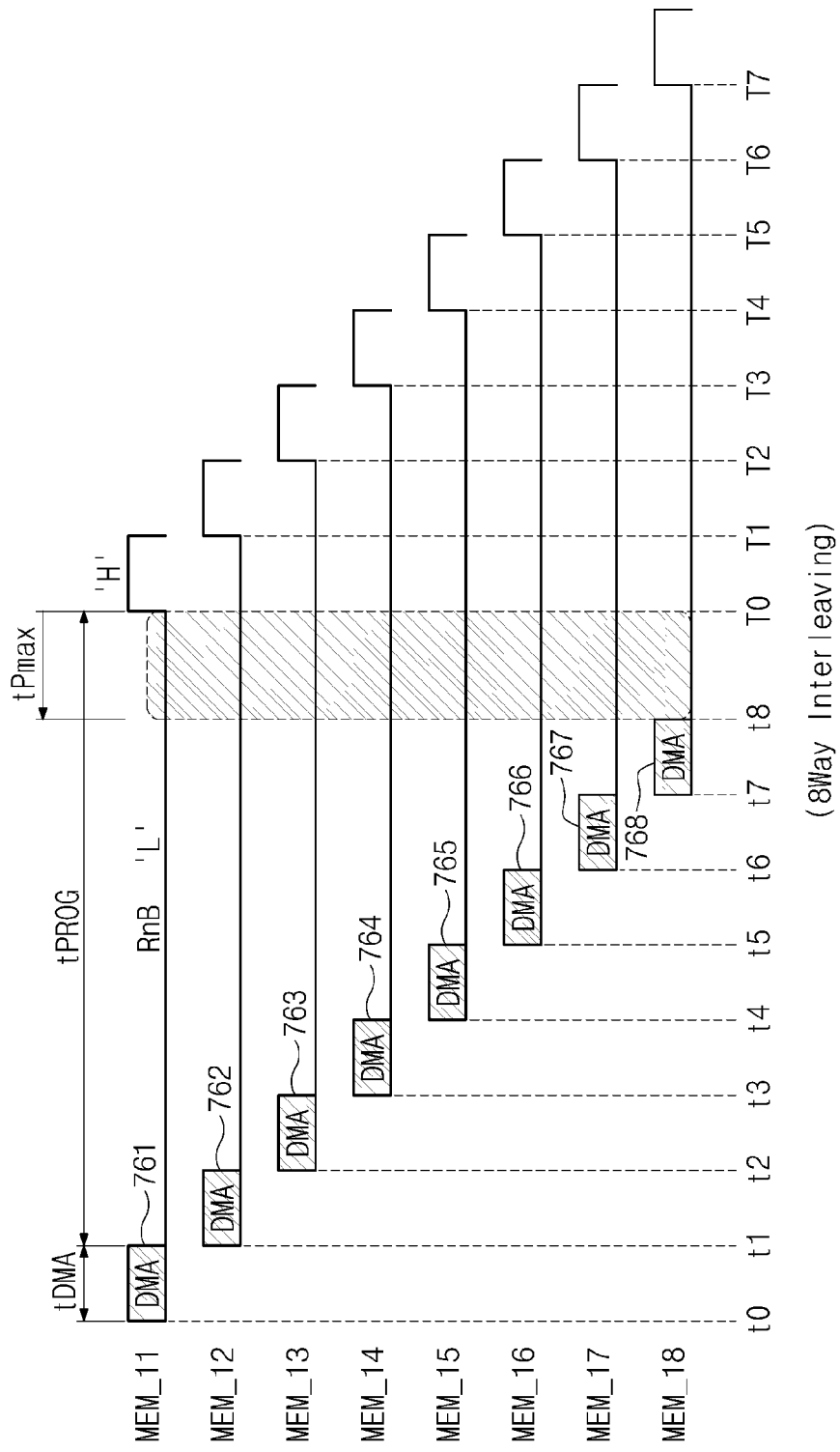

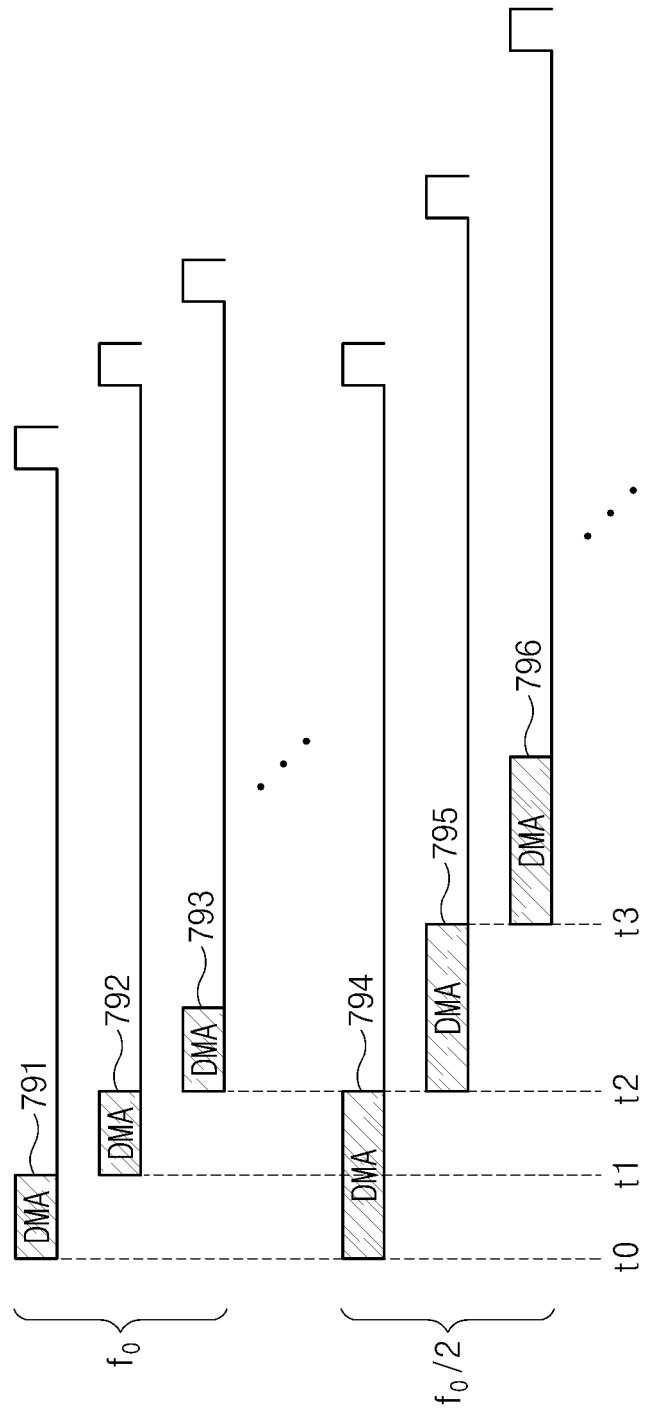

DATA STORAGE DEVICE AND INFORMATION PROCESSING SYSTEM INCORPORATING DATA STORAGE DEVICE

CROSS-REFERENCE TO RELATED APPLICATIONS

This application claims priority under 35 U.S.C. §119 to Korean Patent Application No. 10-2009-0035602 filed on Apr. 23, 2009, and Korean Patent Application No. 10-2009-0054512 filed on Jun. 18, 2009, the respective disclosures of which are hereby incorporated by reference in their entirety.

BACKGROUND

Embodiments of the inventive concept relate generally to electronic devices. More particularly, embodiments of the inventive concept relate to data storage devices and information processing systems incorporating such data storage devices.

Recent years have been marked by a continuing increase in the demand for digital storage media. To address this demand, researchers have developed and refined various types of data storage devices, each providing advantages and/or drawbacks compared with the others.

Hard disk drives (HDDs), for instance, tend to have relatively high storage density, high data transmission speed, fast data access time, and low cost. But they also tend to suffer from mechanical defects and high power consumption on account of their numerous moving parts.

Due to these and other shortcomings, there is an ongoing trend toward replacing HDDs with solid state disks (SSDs) incorporating nonvolatile memories such as flash memories. SSDs generally have fewer moving parts than HDDs, and therefore fewer mechanical defects and lower power consumption. The reduction of moving parts can also reduce latency and mechanical drive time compared with HDDs, allowing SSDs in some instances to execute read and write operations more quickly than HDDs. Moreover, SSDs can also reduce errors caused by latency and mechanical friction, improving reliability of read and write operations. Finally, SSDs tend to produce less heat and noise than HDDs and are largely resistant to external impact, making them attractive for portable devices.

SUMMARY

Embodiments of the inventive concept provide an SSD having adjustable power consumption, and an information processing system incorporating such an SSD.

According to one embodiment of the inventive concept a storage device comprises a plurality of memory devices, and a memory controller that exchanges data with the memory devices via a plurality of channels, decodes a command received from another device to determine a driving power mode, and accesses the memory devices according to the driving power mode.

In certain embodiments, the driving power mode is encoded in a value corresponding to a residual power amount of a power source, and the memory controller activates a portion or all of the channels according to the driving power mode.

In certain embodiments, the memory controller adjusts a degree of interleaving of the activated channels according to the driving power mode.

In certain embodiments, the memory controller adjusts a frequency of a clock signal used to control a rate of data transmission on the activated channels according to the driving power mode.

In certain embodiments, the storage device further comprises a buffer memory buffering data under control of the memory controller, and the memory controller adjusts a frequency of a clock signal used to control the buffer memory according to the driving power mode. In certain embodiments, the memory controller comprises a central processing unit decoding the command, and a clock frequency of the central processing unit is adjusted according to the driving power mode.

In certain embodiments, each of the memory devices comprises a flash memory device, and the memory devices and the memory controller form part of a solid state drive.

According to another embodiment of the inventive concept a data storage device comprises a plurality of memory devices, and a memory controller that exchanges data with the memory devices via a plurality of channels and adjusts a degree of interleaving or bandwidth of the plurality of channels according to a command received from another device. The command is a vendor specific command generated in accordance with a basic input/output system (BIOS) configuration value.

In certain embodiments, the memory controller decodes the command to generate a driving power mode and activates a portion or all of the channels according to the driving power mode.

In certain embodiments, the memory controller adjusts the degree of interleaving of the activated channels according to the driving power mode. In certain embodiments, the memory controller adjusts access start times of the respective activated channels according to the driving power mode.

In certain embodiments, the data storage device further comprises a buffer memory that buffers data under control of the memory controller, and the memory controller adjusts a frequency of a clock for driving the buffer memory according to the driving power mode.

In certain embodiments, the memory controller comprises a central processing unit that decodes the command, and wherein a clock frequency of the central processing unit is adjusted according to the driving power mode.

In certain embodiments, the memory controller adjusts a clock frequency used to operate activated channels according to the driving power mode.

In certain embodiments, each of the memory devices comprises a flash memory device, and wherein the memory devices and the memory controller form part of a solid state drive.

According to still another embodiment of the inventive concept, an information processing system comprises a host generating a command based on a state of a power source, and a solid state drive that exchanges data with the host in response to the command and operates at a performance level based on a driving power mode encoded in the command.

In certain embodiments, the driving power mode is encoded as a value corresponding to a residual power amount of the power source, and in certain embodiments, the host generates the driving power mode based on basic input/output system (BIOS) configuration information.

BRIEF DESCRIPTION OF THE DRAWINGS

Embodiments of the inventive concept are described below with reference to the accompanying drawings. In the drawings, like reference numbers denote like features.

FIG. 3 is a block diagram illustrating channels and memory devices controlled by a flash interface in FIG. 1.

FIGS. 4A and 4B are tables illustrating different values of a vendor specific command VS_CMD and corresponding data storage device configurations.

FIGS. 5A through 5C are timing diagrams illustrating different interleaving access schemes of a data storage device.

FIG. 6A is a timing diagram illustrating an embodiment of the inventive concept in which a driving clock frequency of a flash interface is varied.

FIG. 6B is a timing diagram for describing channel skew in a data storage device.

FIG. 13 is a diagram illustrating a configuration of an access command according to an embodiment of the inventive concept.

FIGS. 14A through 14C are tables illustrating various example driving power modes of a data storage device.

FIGS. 15A through 15D are timing diagrams illustrating various example interleaving access modes of a data storage device.

FIG. 16 is a timing diagram illustrating an embodiment of the inventive concept in which a driving clock frequency of a flash interface is varied.

DETAILED DESCRIPTION OF THE EMBODIMENTS

Embodiments of the inventive concept are described below with reference to the accompanying drawings. These embodiments are provided as teaching examples and should not be construed to limit the scope of the inventive concept.

Certain embodiments are described using an SSD as an example of a memory system, and a NAND flash memory as an example of a storage medium within the memory system. The inventive concept, however, is not limited to these examples. For instance, other types of memories could be used as the storage medium, such as phase-change random access memories (PRAM), magnetoresistive random access memory (MRAM), resistive random access memory (RRAM), ferroelectric random access memory (FRAM) or a NOR flash memory. Moreover, some embodiments may use more than one type of memory as a storage medium.

Figure 1:
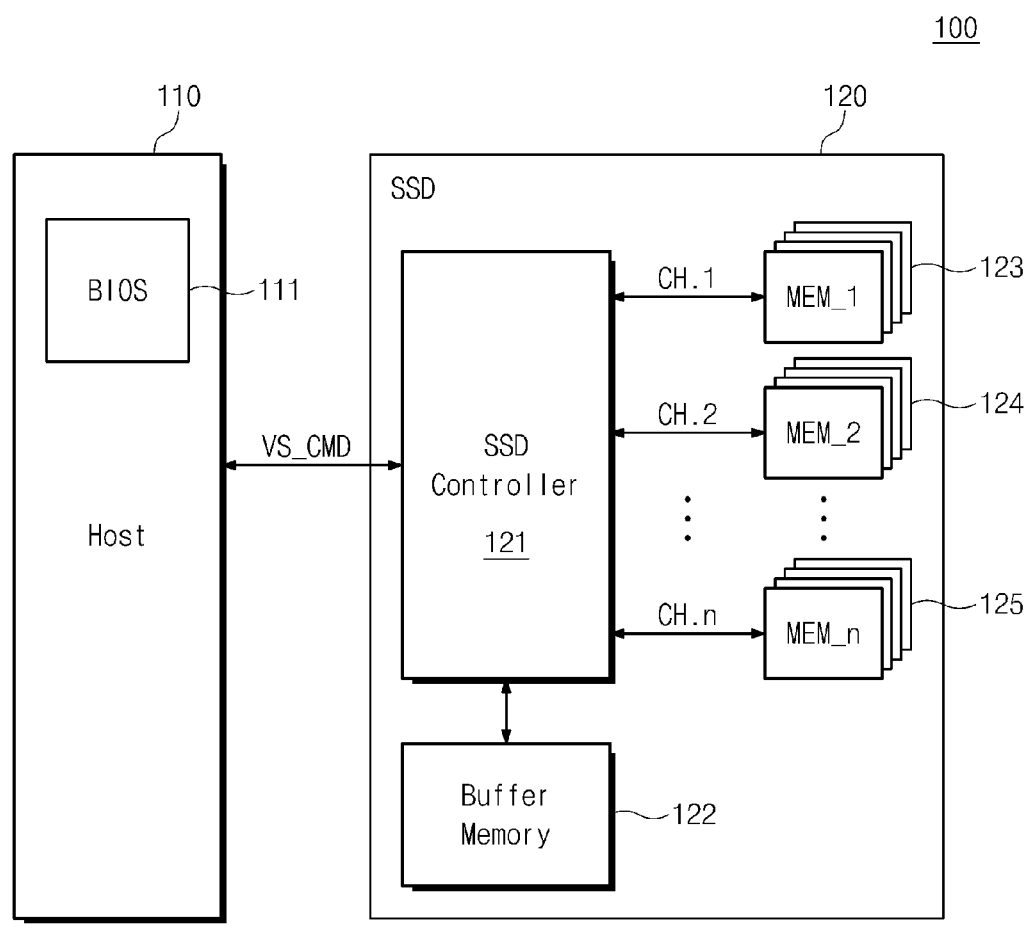
FIG. 1 is a block diagram illustrating an information processing system according to an embodiment of the inventive concept.

FIG. 1 is a block diagram illustrating an information processing system 100 according to an embodiment of the inventive concept. In this embodiment, information processing system 100 comprises a host 110 and a SSD 120.

Host 110 controls SSD 120 to store and read data. SSD 120 stores data in memory device groups 123 through 125 in response to write requests from host 110 and reads data stored memory device groups 123 through 125 in response to a read requests from host 110. Host 110 comprises a basic input/output (IO) system (BIOS) 111 of information processing system 100.

Each of memory device groups 123 through 125 comprises a plurality of memory devices sharing a common communication channel. In particular, memory devices in memory device group 123 share a channel CH.1; memory devices in memory device group 124 share a channel CH.2; and memory devices in memory device group 125 share a channel CH.n.

BIOS 111 comprises basic configuration information of information processing system 100. For example, BIOS 111 typically stores information for configuring devices in information processing system 100. A user can change values in BIOS 111 to adjust certain operating parameters of information processing system 100. BIOS 111 is typically mounted on a main board of information processing system 100 in a read only memory (ROM) chip type.

During initial booting of information processing system 100, a user may select, check, change and adjust the configuration of hardware devices in information processing system 100 using a configuration program of BIOS 111. For example, a user may control a date and time of an internal clock, or select a transmission mode of an optical disk drive (ODD) or SSD. The configuration program of BIOS 111, may also allow the user to select whether to use an L1 or L2 cache of a central processing unit (CPU), check a memory, control the operating speed of the CPU, select the priorities of various booting drives, control the speed of a keyboard, set power management, change interrupt handling, select a serial port and a parallel port, and designate an alternative power source for information processing system 100.

Following initial booting and power-on of information processing system 100, BIOS 111 checks hardware devices of information processing system 100 to determine whether they are operating normally. Such a check is referred to as a power on self test (POST). Where the sequential check indicates that the devices are operating normally, BIOS 111 gives booting authority to an operating system (OS) boot loader, which subsequently completes booting of information processing system 100.

BIOS 111 further comprises power configuration information for SSD 120 and information regarding other operational characteristics of SSD 120. The power configuration information may comprise, for instance, a driving power mode P_mode for determining the amount of power supplied to SSD 120 and/or the allocation of power within SSD 120.

Following configuration of BIOS 111, host 110 provides a control command to SSD 120 based on the SSD power configuration information in BIOS 111. Host 110 issues a vendor specific command VS_CMD to SSD 120 to change or adjust certain configuration parameters of SSD 120. Vendor specific command VS_CMD typically reflects a vendor of host 110 or some of its parts. Accordingly, the transmission of vendor specific command VS_CMD may allow SSD 120 to be configured in accordance with vendor specific requirements of host 110.

SSD 120 assumes driving power mode P_mode upon receiving vendor specific command VS_CMD. Driving power mode P_mode may affect any of several different operating characteristics of SSD 120 to adjust its power consumption. For instance, driving power mode P_mode may cause SSD 120 to activate some or all of channels CH.1 through CH.n connected to memory device groups 123 through 125; it may determine an interleaving scheme (e.g., 2-way interleaving, 4-way interleaving, etc.) of channels CH.1 through CH.n; it may determine the frequency of a data transmission clock of channels CH.1 through CH.n; or it may adjust a driving clock frequency of a buffer memory 122 or a clock frequency of a CPU (not shown) in an SSD controller 121.

SSD 120 comprises SSD controller 121, buffer memory 122, and memory device groups 123 through 125. SSD 120 decodes vendor specific command VS_CMD to control memory device groups 123 through 125 and buffer memory 122 in a mode corresponding to driving power mode P_mode.

SSD controller 121 acts as a physical interface between host 110 and SSD 120 using the bus format of host 110. SSD controller 121 decodes vendor specific command VS_CMD from host 110 and sets data interleaving schemes or channel bandwidths for memory device groups 123 through 125 according to the decoded result. SSD controller 121 can change the clock frequencies of different channels, adjust the driving clock frequency of buffer memory 122, or adjust the clock frequency of a CPU within SSD controller 121 based on the decoded value of vendor specific command VS_CMD.

Buffer memory 122 temporarily stores writing data provided from host 110 or data read from memory device groups 123 through 125. Buffer memory 122 may also serve a caching function for SSD 120. For instance, buffer memory 122 may cache data from memory device groups 123 through 125 and provide efficient access to the cached data in response to read operations from host 110.

In some embodiments, host 110 transmits data at a higher rate than channels CH.1 through CH.n within SSD 120. Accordingly, buffer memory 122 may store large amounts of data (e.g., for caching) to minimize performance degradation due to the different transmission rates. In general, buffer memory 122 may comprise a synchronous dynamic random access memory (SDRAM) or any of various other types of memory.

Memory device groups 123 through 125 each comprise multiple memory devices. Collectively, these devices form main storage medium of SSD 120. The memory devices in memory device groups 123 through 125 may comprise, for instance, NAND flash memory devices, DRAM, and/or SRAM.

Each of memory device groups 123 through 125 is connected to SSD controller 121 via a corresponding one of channels CH.1 through CH.n. The memory devices within each of memory device groups 123 through 125 share the corresponding channel among channels CH.1 through CH.n. In the description that follows, it will be assumed that the memory devices in memory device groups 123 through 125 are NAND flash memory devices. However, one of more of the memory devices could be substituted or supplemented with other types of memory, such as PRAM, MRAM, RRAM, FRAM and NOR flash memory.

As indicated above, information processing system 100 selects driving power mode P_mode of SSD 120 based on configuration information of BIOS 111, and power mode P_mode can be used to adjust the amount of power used by SSD 120. Accordingly, the power consumption of SSD 120 can be modified by changing the configuration information in BIOS 111 during or before initialization or booting of information system 100.

Figure 2:
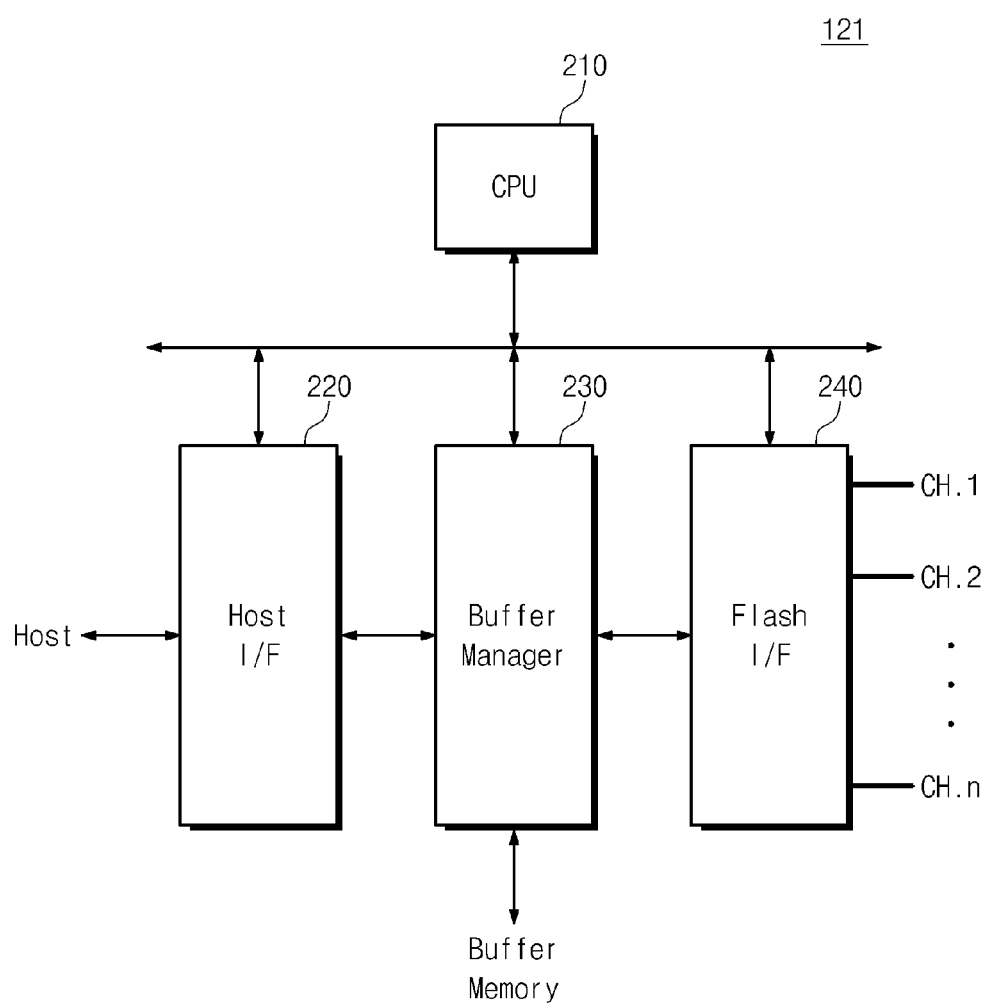
FIG. 2 is a block diagram illustrating an embodiment of an SSD controller in FIG. 1.

FIG. 2 is a block diagram illustrating an embodiment of SSD controller 121 in FIG. 1. In this embodiment, SSD controller 121 comprises a CPU 210, a host interface 220, a buffer manager 230 and a flash interface 240.

CPU 210 decodes vendor specific command VS_CMD transferred from host 110 and configures driving power conditions of SSD 120 based on the decoded value of vendor specific command VS_CMD. CPU 210 can generate arbitrary commands by setting different values in control registers (not shown) in flash interface 240 or host interface 220. CPU 210 can also transfer control information for reading and writing operations to registers of flash interface 240 and host 110. CPU 210 typically stores the received vendor specific command VS_CMD in a register of host interface 220.

Host interface 220 receives reading and writing commands from host 110 and informs CPU 210 when such a reading or writing command is received. CPU 210 then informs flash interface 240 of the reading or writing command and controls the elements of SSD 120 to perform reading or writing operations. In some embodiments, CPU 210 controls various elements of SSD 120 through corresponding firmware.

Host interface 220 acts as a physical interface between host 110 and SSD 120 according to the bus format of host 110. The bus format can use any of various protocols, such as universal serial bus (USB), small computer system interface (SCSI), PCI express, ATA, parallel ATA (PATA), serial ATA (SATA) or serial attached SCSI (SAS), to name but a few. Host interface 220 may also support disk emulation so host 110 may recognize SSD 120 as an HDD. Host interface 220 may also function as a flash translation layer (FTL) for concealing deletion operations or other details of flash memory devices in SSD 120.

Buffer manager 230 controls reading and writing operations of buffer memory 122. Buffer manager 230 temporarily stores writing data and reading data in buffer memory 122. Buffer manager 230 can adjust the frequency of the driving clock of buffer memory 122 under control of CPU 210 to control its power consumption. For instance, where buffer memory 122 comprises a volatile memory such as an SDRAM, lowering its clock frequency typically reduces its power consumption. Accordingly, buffer manager 230 may control buffer memory 122 to operate with a higher frequency where performance takes precedence over power saving, or with a lower frequency where power saving takes precedence over power saving.

Flash interface 240 exchanges data between buffer memory 122 and memory device groups 123 through 125. In particular, flash interface 240 transfers data from buffer memory 122 to channels CH.1 through CH.n and from channels CH.1 through CH.n to buffer memory 122 via buffer manager 230. The data transferred to channels CH.1 through CH.n is typically scattered or distributed by flash interface 240 so that it can be stored among the different memory device groups 123 through 125. The data transferred from channels CH.1 through CH.n is typically consolidated for storage in buffer memory 122.

Flash interface 240 controls a channel bandwidth, interleaving scheme, or frequency of channels CH.1 through CH.n under the control of CPU 210. CPU 210 sets operating parameters of flash interface 240 according to the value of driving power mode P_mode derived from vendor specific command VS_CMD. These operating parameters can control the number of channels CH.1 through CH.n used and the degree of interleaving of channels CH.1 through CH.n.

Where driving power mode P_mode is a full performance mode (or a full power mode), all of channels CH.1 through CH.n are activated, and the degree of interleaving of each channel is at a maximum. On the other hand, where driving power mode P_mode has a different value, the degree of interleaving or the number of activated channels can be limited. In other words, flash interface 240 accesses memory devices in accordance with operating parameters corresponding to driving power mode P_mode.

In some embodiments, information processing system 100 may have a limited amount of remaining power (i.e., a residual power amount). This may be the case, for instance, where information processing system 100 is powered by a battery. Where information processing system 100 has a limited residual power amount, it may be advantageous to control SSD 120 to conserve power.

FIG. 3 is a block diagram illustrating channels and memory devices controlled by flash interface 240 in FIG. 1. Flash interface 240 is connected to memory device groups 123 through 125 via channels CH.1 through CH.n.

Memory device groups 123 through 125 each comprise "m" memory devices. In particular, memory device group 123 comprises memory devices MEM_11 through MEM_1m, memory device group 124 comprises memory devices MEM_21 through MEM_2m, and memory device group 125 comprises memory devices MEM_n1 through MEM_nm. Each memory device in memory device groups 123 through 125 has an input/output (IO) port, e.g., an 8-bit IO port.

Where vendor specific command VS_CMD is input to SSD 120 from host 110, CPU 210 decodes vendor specific command VS_CMD and stores the decoded command in register 241 of flash interface 240. The number of channels CH.1 through CH.n that are simultaneously activated is determined according to the command stored in register 241. Additionally, the number of memory devices within each memory device group that are simultaneously selected for data interleaving is also determined according to the command stored in register 241.

In addition to the decoded vendor specific command VS_CMD, command register 241 may further store clock frequency information for exchanging data with memory devices. Command register 241 may also store express channel setting data, such as specific interleaving parameters or channel activation parameters for implementing power saving operations. Moreover, although a plurality of channels may be activated at the same time, the timing of data transmission on different channels may be variously configured, or in other words, flash interface 240 may be configured to have channel skew.

FIGS. 4A and 4B are tables illustrating examples of driving power mode P_mode, which is produced by decoding vendor specific command VS_CMD. Various operating parameters of SSD 120 are determined by driving power mode P_mode, as indicated by the examples of FIGS. 4A and 4B.

For explanation purposes, it will be assumed that flash interface 240 comprises eight channels CH.1 through CH.8 and the IO ports of eight memory devices are shared by each of the channels. In other words, it is assumed that flash interface 240 controls memory devices in an 8 channel bandwidth/8-way interleaving (8CH/8Way) scheme. The degree of interleaving (8-way in this example) indicates the number of memory devices sharing a channel.

In the example of FIG. 4A, driving power mode P_mode has a 3-bit size. Where driving power mode P_mode is '000', SSD 120 activates eight channels and uses eight way interleaving. In this case, memory devices are accessed in a full power mode for providing high performance. Accordingly, the power consumption of SSD 120 may reach a maximum value.

Where driving power mode P_mode is '001 ', SSD 120 activates four channels and uses four way interleaving to manage memory devices in a half power mode. Where driving power mode P_mode is '010 ', SSD 120 activates two channels and uses two way interleaving to manage memory devices in a quarter power mode. Where driving power mode P_mode is '011 ', SSD 120 activates one channel and uses one way interleaving to manage memory devices in the minimum power mode.

The values '100', '101', '110' and '111 ' of driving power mode P_mode may be used as reserved bits for providing additional features or setting additional modes of SSD 120. Four driving power modes P_mode may have been described above by way of example, but other driving power modes may be used in alternative embodiments of the inventive concept.

FIG. 4B is a table illustrating an embodiment in which driving power mode P_mode has additional values compared with FIG. 4A. In particular, FIG. 4B illustrates an embodiment in which driving power mode P_mode has additional values corresponding to different driving clock frequencies of SSD 120.

Referring to FIG. 4B, frequencies $f_b$, $f_c$ and $f_i$ of a driving clock CLK in SSD 120 may be varied according to the value of driving power mode P_mode. As indicated by the legend in FIG. 4B, $f_b$ denotes the frequency of a buffer memory clock controlling the operating rate of buffer memory 122; $f_c$ denotes the frequency of a CPU clock controlling the operating rate of CPU 210; and $f_i$ denotes the frequency of a channel clock controlling the operating rate of channels CH.1 through CH.n (or flash interface 240). These different clocks can be implemented in a variety of ways. For instance, a clock for controlling the operating rate of flash interface 240 may take the form of a writing enable signal /WE or a reading enable signal /OE provided to a memory device from flash interface 240.

Where a Most Significant Bit (MSB) value among the 3-bit driving power mode P_mode is '0 ', the frequencies $f_b$, $f_c$ and $f_i$ assume default values. Meanwhile, the other two bits of driving power mode P_mode determine the number of activated channels and degree of interleaving of SSD 120. For instance, where the value of driving power mode P_mode is '000 ', memory devices are accessed using an 8 channel/8-way interleaving (8CH/8Way) scheme (full power mode PM0), and frequencies $f_b$, $f_c$ and $f_i$. Where the value of driving power mode P_mode is '001 ', memory devices are accessed using a 4CH/4Way scheme (power mode PM1) and frequencies $f_b$, $f_c$ and $f_i$. Where the value of driving power mode P_mode is '010 ', memory devices are accessed using a 2CH/2Way scheme (power mode PM2) and frequencies $f_b$, $f_c$, and $f_i$. Where the value of driving power mode P_mode is '011 ', memory devices are accessed using a 1CH/1Way scheme (power mode PM2) and frequencies $f_b$, $f_c$ and $f_i$.

Where the MSB value among the 3-bit driving power mode P_mode is '1', frequencies $f_b$, $f_c$ and $f_i$ are substituted with lower frequencies $f_b/2$, $f_c/2$ and $f_i/2$. In other words, the CPU clock, buffer memory clock, and channel clock operate with these new, slower frequencies.

Where the value of driving power mode P_mode is '100', memory devices are accessed using a 8CH/8Way scheme (power mode PM0') with frequencies $f_b/2$, $f_c/2$ and $f_i/2$. Where the value of driving power mode P_mode is '101', memory devices are accessed using a 4CH/4Way scheme (power mode PM1') with frequencies $f_b/2$, $f_c/2$ and $f_i/2$. Where the value of driving power mode P_mode is '110 ', memory devices are accessed using a 2CH/2Way scheme (power mode PM2') with frequencies $f_b/2$, $f_c/2$ and $f_i/2$. Where the value of driving power mode P_mode is '111', SSD 120 is driven in the minimum power mode. That is, memory devices are accessed through a 1CH/1Way scheme (power mode PM3') with frequencies $f_b/2$, $f_c/2$ and $f_i/2$.

In the embodiment of FIG. 4, driving power mode P_mode has different values corresponding to full power mode PM0, half power mode PM1, quarter power mode PM2 and minimum power mode PM3. However, embodiments of the inventive concept are not limited to these specific modes or their corresponding parameters.

Figure 5A:
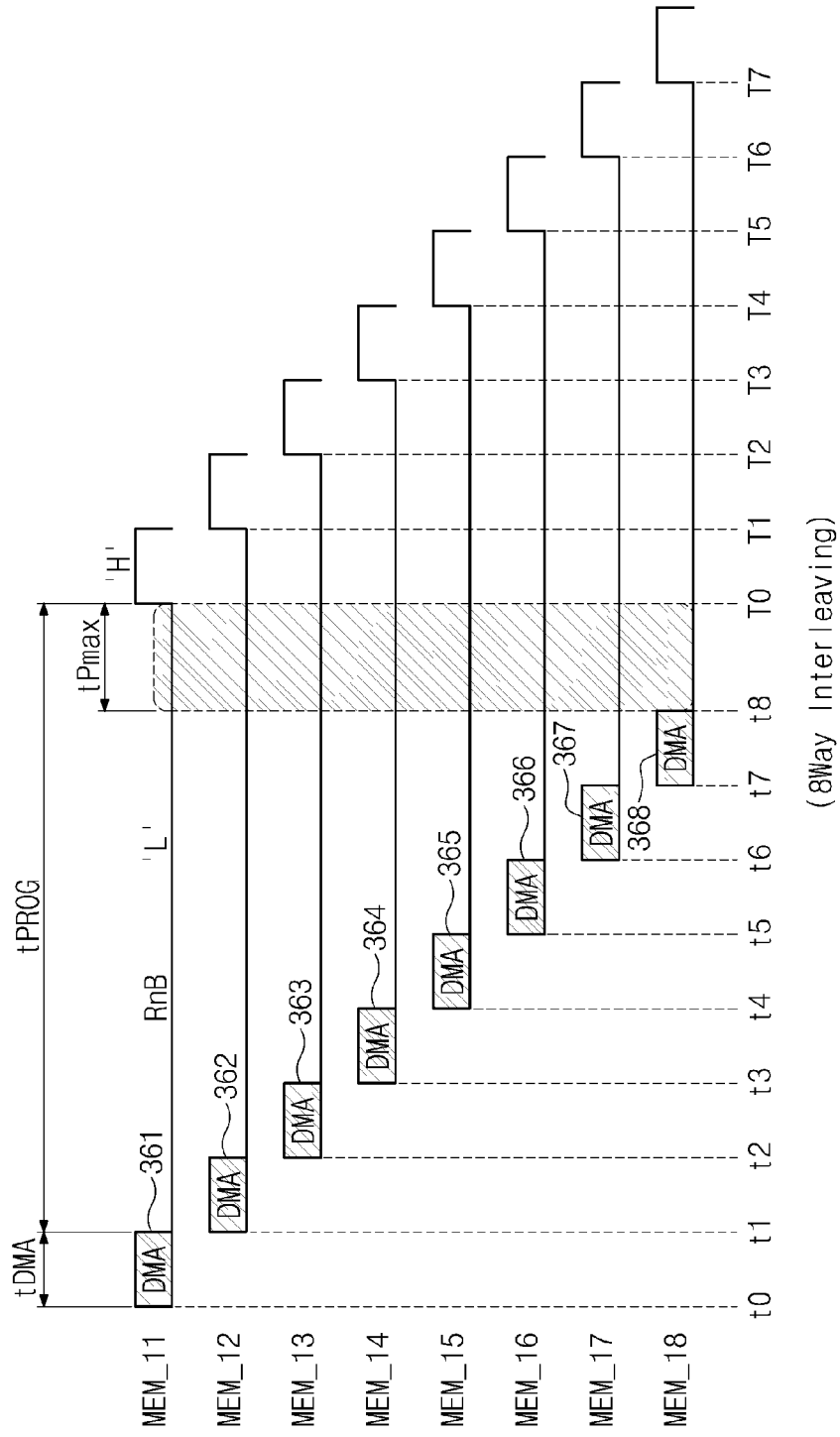
Figure 5B:
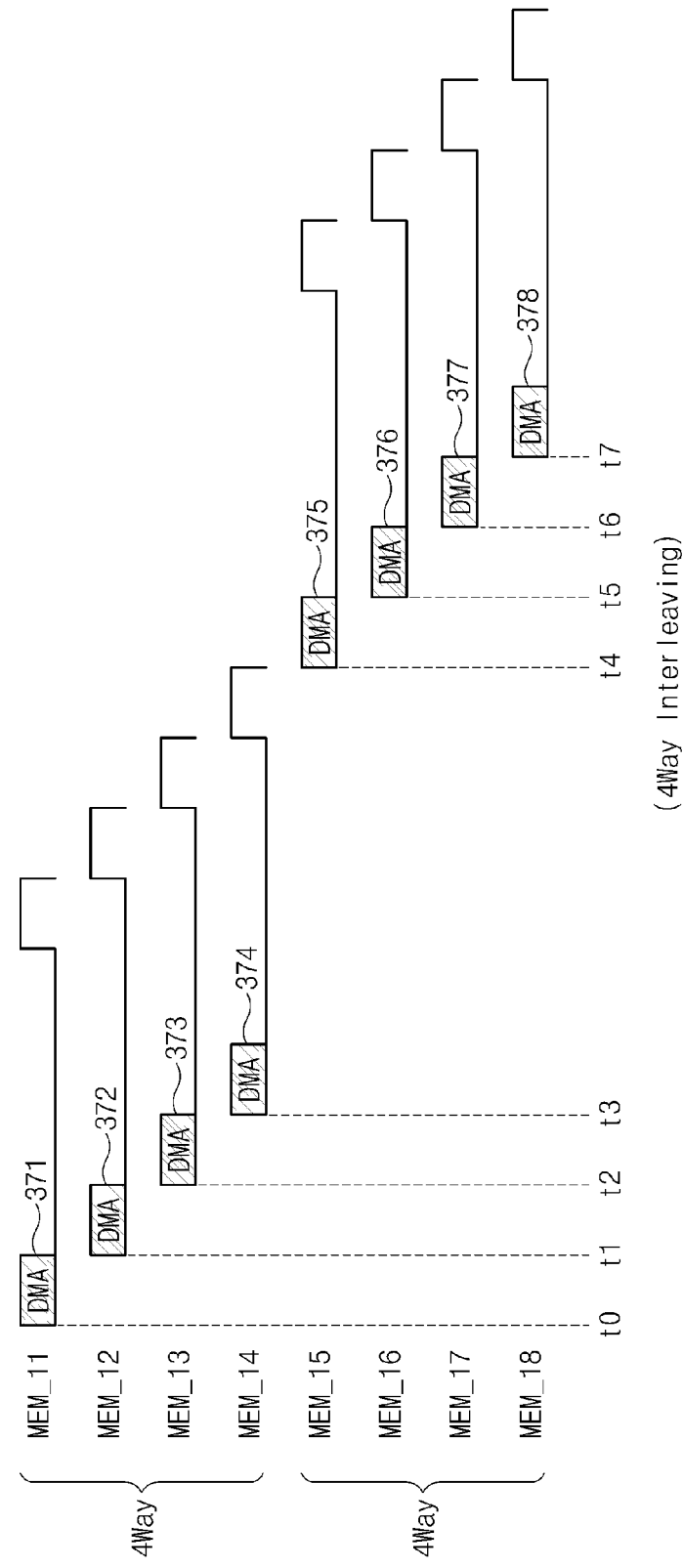

FIGS. 5A through 5C are timing diagrams illustrating interleaving access schemes of memory devices connected to the same channel according to the value of driving power mode P_mode. In particular, FIG. 5A illustrates an 8-way interleaving scheme, FIG. 5B illustrates a 4-way interleaving scheme, and FIG. 5C illustrates a 2-way interleaving scheme.

Referring to FIG. 5A, eight memory devices MEM_11 through MEM_18 sharing an input/output port are connected to one channel (i.e., channel CH.1). It is assumed that SSD 120 receives driving power mode P_mode from host 110 to perform writing operations in an 8-way interleaving scheme. To write data in one memory device MEM_11, write data may be provided from buffer memory 122 to memory device MEM_11 according to a direct memory access (DMA) operation.

A DMA interval tDMA is used to transmit writing data (e.g., 4 Kbytes or 16 Kbytes) to one memory device MEM_11 in the DMA operation. A program interval tPROG is used to program writing data provided to memory device MEM_11 in a memory cell array of memory device MEM_11. A ready/busy pin RnB of memory device MEM_11 maintains a logic level 'L' during program interval tPROG as writing data is programmed in the memory cell array. The level of ready/busy pin RnB of memory device MEM_11 is changed to a logic level 'H' after all writing data is programmed in the memory cell array.

As soon as a DMA operation 361 for one memory device MEM_11 is completed, a DMA operation 362 for another memory device MEM_12 is started. Following this pattern, eight memory devices are successively programmed in eight DMA operations 361 through 368 during program interval tPROG as illustrated in FIG. 5A. The eight memory devices are programmed via the same channel CH.1, or in other words, channel CH.1 uses 8-way interleaving to facilitate programming operations of eight memory devices.

Although 8-way interleaving allows eight memory devices MEM_11 through MEM_18 to be programmed during a single program interval tPROG, it also requires a relatively high level of power consumption. For instance, during a time tPmax, which is shaded in FIG. 5A, all eight memory devices in memory device group 123 are being programmed at the same time (i.e., their individual program intervals tPROG overlap), as indicated by the logic level 'L' of the corresponding ready/busy pins.

FIG. 5B is a timing diagram illustrating an embodiment of the inventive concept applying 4-way interleaving in a writing operation.

Referring to FIG. 5B, four memory devices MEM_11 through MEM_14 sharing channel CH.1 are divided in a first interleaving unit, and other four memory devices MEM_15 through MEM_18 are divided in a second interleaving unit. The memory devices of the first interleaving unit are programmed using 4-way interleaving, and the memory devices of the second interleaving unit are then programmed using 4-way interleaving. Accordingly, only four memory devices are simultaneously programmed under control of flash interface 240, which reduces instantaneous power consumption by information processing system 100.

FIG. 5C is a timing diagram illustrating an embodiment of the inventive concept using 2-way interleaving in a writing operation. Referring to FIG. 5C, two memory devices MEM_11 through MEM_12 sharing channel CH.1 are included in a first interleaving unit, two memory devices MEM_13 through MEM_14 are included in a second interleaving unit, two memory devices MEM_15 through MEM_16 are included in a third interleaving unit, and two memory devices MEM_17 through MEM_18 are included in a fourth interleaving unit. Each of interleaving units is controlled by flash interface 240 to be programmed after the previous interleaving unit completes programming. Only two memory devices are simultaneously programmed, reducing the instantaneous power consumption of information processing system 100.

Although not shown in FIG. 5, vendor specific command VS_CMD may have a level indicating no interleaving in SSD 120. Where there is no interleaving in SSD 120, the DMA interval tDMA and program interval tPROG of different memory devices connected to the same channel do not overlap. This results in even less power consumption by information processing system 100.

FIGS. 6A and 6B are timing diagrams illustrating another embodiment of the inventive concept. In particular, FIG. 6A shows another embodiment of the inventive concept in which the clock frequency of a channel is varied according to vendor specific command VS_CMD. FIG. 6B shows another embodiment of the inventive concept in which skew is provided to different channels according to vendor specific command VS_CMD.

Referring to FIG. 6A, the data transmission clock of a channel is provided to the channel by flash interface 240. That is, writing enable signal/WE or output enable signal/OE of memory devices that are connected to respective channels is generated according to a clock signal provided by flash interface 240. Accordingly, the frequency of a clock provided to flash interface 240 determines the access speed of the memory devices. More specifically, the frequency of a clock provided to flash interface 240 determines the input speed of a writing data loaded into each memory device in a DMA operation.

In the case of clock frequency $f_i$ corresponding to a default value, the input time of writing data by a DMA operation corresponds to a time section t0-t1 in a DMA 391. On the other hand, where clock frequency $f_i/2$ is provided, the input time of writing data by the DMA operation increases by approximately two times to a time section t0-t2 in a DMA 394. In some embodiments, the power consumption of a device is proportional to the square of the frequency of a clock. Accordingly, power consumption may be reduced by reducing the clock frequency.

Although the above description of FIG. 6A, discusses only the frequency of the clock signal provided to flash interface 240, the clock frequencies or operating frequencies of other features could be similarly modified to adjust power consumption or other characteristics of SSD 120 or information processing system 100. For instance, frequencies $f_b$ and $f_c$ could also be modified in some embodiments.

FIG. 6B is a timing diagram illustrating channel skew established between different channels in response to vendor specific command VS_CMD. Flash interface 240 may control, for instance, the starting times of DMA operations in different channels so that they are offset with respect to each other. For instance, the offset between the timing of channels CH.1 and CH.2 (i.e., the channel skew) is the difference between time "t0" where a DMA operation 397 is started in channel CH.1 and time "t1" where a DMA operation 398 is started in channel CH.2. Channel skew also exists between channel CH.2 and channel CH.3. By controlling the channel skew, the overlap between the DMA interval tDMA and program interval tPROG of different memory devices can be reduced without decreasing channel bandwidth. Accordingly, a rapid increase of instantaneous power consumption can be prevented.

Figure 7:
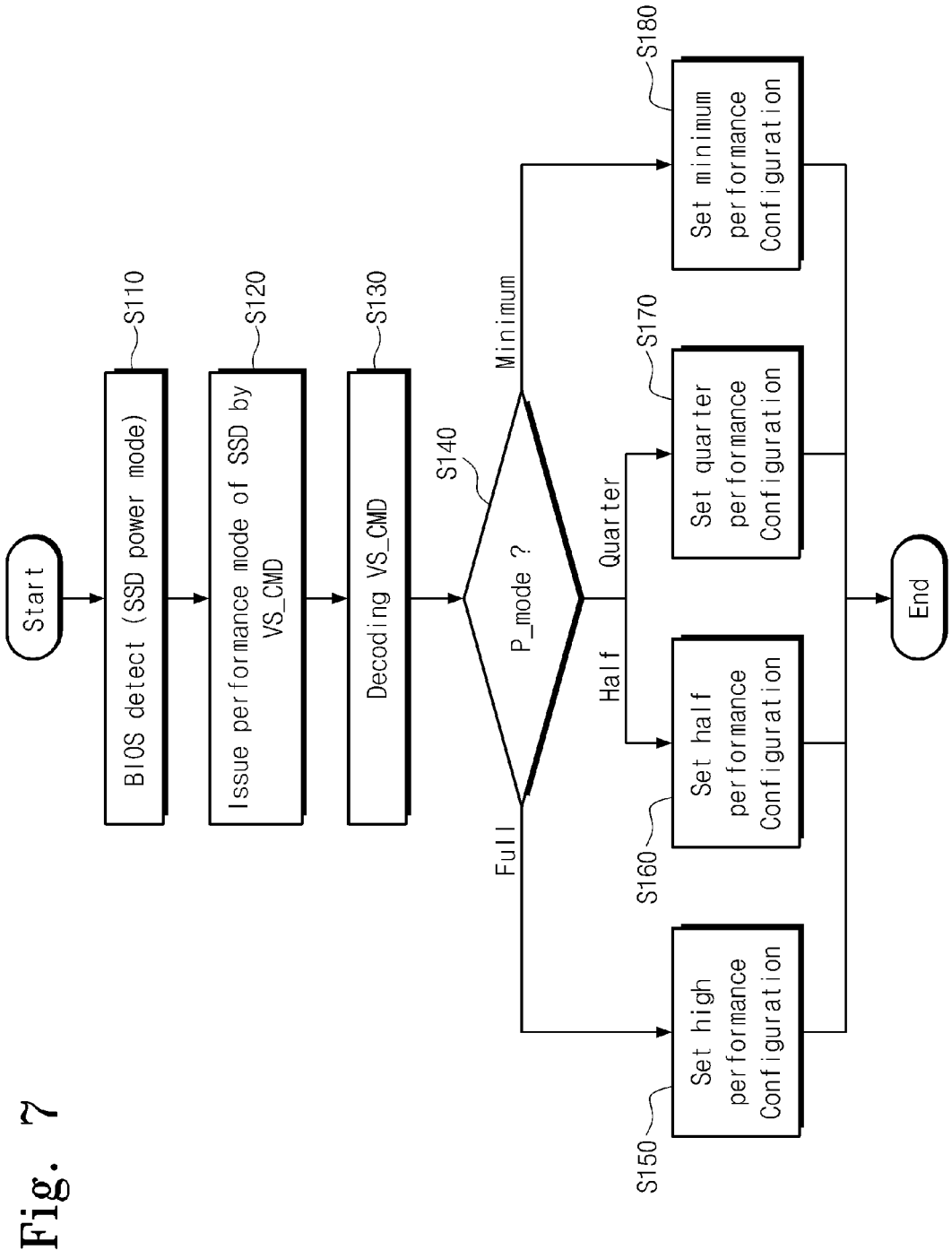
FIG. 7 is a flow chart illustrating a control operation of an information processing system according to an embodiment of the inventive concept.

FIG. 7 is a flow chart illustrating a method of operating information processing system 100 according to an embodiment of the inventive concept. In the method of FIG. 7, information processing system 100 generates vendor specific command VS_CMD to control power mode P_mode of SSD 120 based on the configuration value of BIOS 111. SSD 120 decodes vendor specific command VS_CMD to determine the value of driving power mode P_mode, and undergoes configuration based on the value of driving power mode P_mode. In the description that follows, example method steps are denoted by parentheses (SXXX).

Upon booting or resetting operation, information system 100 retrieves configuration information from BIOS 111, including SSD power mode information (S110). Host 110 transfers vendor specific command VS_CMD to SSD 120 to control its driving power mode P_mode (S120). SSD 120 then receives and decodes vendor specific command VS_CMD to generate driving power mode P_mode (S130).

SSD controller 121 then adjusts operating parameters of SSD 120 according to driving power mode P_mode (S140). For instance, the various driving power modes of FIG. 4A can be applied to produce different levels of channel activation or interleaving in SSD 120. These different modes include driving power mode P_mode '000', which is a maximum power mode (S150), driving power mode '001', which is a half power mode (S160), driving power mode '010', which is a quarter power mode (S170), and driving power mode '011', which is a minimum power mode (S180).

Although not shown, frequencies $f_b$, $f_c$ and $f_i$ may be modified within the context of steps S150 through S180 to implement the different driving power modes illustrated in FIG. 4B.

Figure 8:
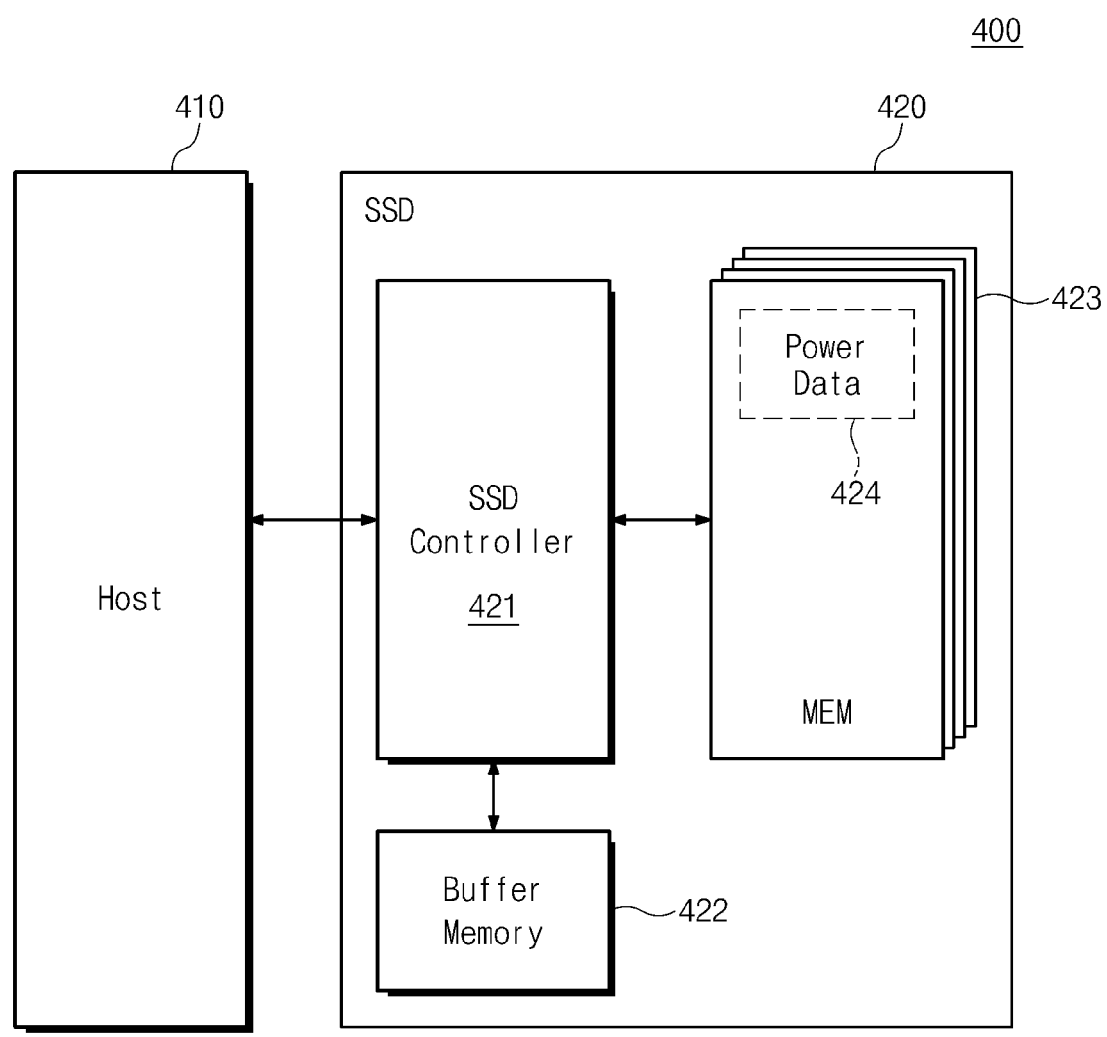
FIG. 8 is a block diagram illustrating an information processing system according to another embodiment of the inventive concept.

FIG. 8 is a block diagram illustrating an information processing system 400 according to another embodiment of the inventive concept.

Referring to FIG. 8, information processing system 400 controls the driving power mode of an SSD 420 control by a host 410. Instead, in information processing system 400, SSD 420 autonomously generates and sets a driving power mode without receiving a command from host 410, such as vendor specific command VS_CMD.

Host 410 periodically checks a residual power amount of a power source (for example, a battery) and updates a designated storage region of SSD 420 with the amount. The data indicating the residual power amount is called power data. Power data 424 is stored and periodically updated in a memory device 423 of SSD 420 by host 410.

An SSD controller 421 receives the location information of power data 424 from host 410 or detects power data 424 stored in a designated memory region. SSD controller 421 generates driving power mode P_mode according to the detection result. SSD controller 421 controls or resets the operating parameters of SSD 420 according to the generated driving power mode P_mode. That is, SSD controller 421 controls SSD 420 to operate according to the value of driving power mode P_mode as illustrated, for instance, in the example of FIG. 4A or 4B. By determining the value of driving power mode P_mode, SSD 420 can adjust its own operating parameters without the express control of host 410.

Figure 9:
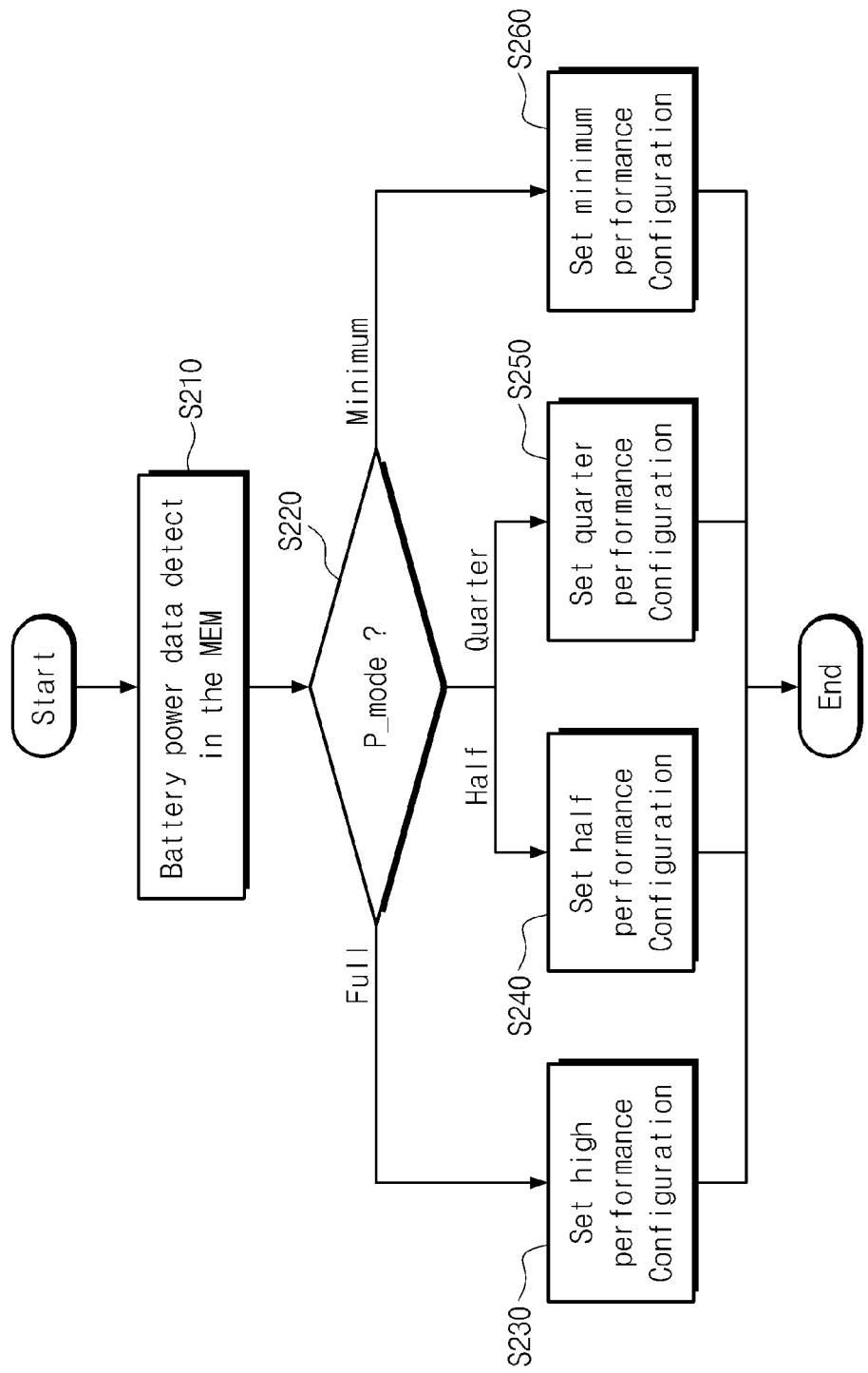
FIG. 9 is a flow chart illustrating the operation of the information processing system in FIG. 8.

FIG. 9 is a flow chart illustrating the operation of information processing system 400 in FIG. 8. In the method of FIG. 9, SSD 420 generates driving power mode P_mode without receiving a corresponding command (e.g., command VS_CMD) from host 410, and establishes operating parameters corresponding to the generated driving power mode P_mode.

Referring to FIG. 9, SSD controller 421 periodically detects power data 424 stored in a designated region of a memory within SSD 420 and analyzes power data 424 to calculate the residual power amount of a power source (S210). SSD controller 421 then generates driving power mode P_mode according to the value of the residual power amount (S220). Next, SSD controller 421 adjusts base operating parameters of SSD 420 according to the value of driving power mode P_mode. As examples, SSD 420 could operate using the different parameters illustrated in FIGS. 4A and 4B. For instance, SSD 420 could be operated in a full power mode based on the driving power mode value '000' (S230), a half power mode based on the driving power mode value '001' (S240), a quarter power mode based on the driving power mode value '010' (S250), or a minimum power mode based on the driving power mode value '011' (S260).

Although not illustrated in FIG. 9, frequencies $f_b$, $f_c$ and $f_i$ of different internal clock signals within SSD 420 (e.g., the clock signals of the CPU, buffer memory and flash interface) may also be modified within the context of steps S130 through S260. Moreover, flash interface 240 may be operated to provide channel skew for different channels.

In the embodiments of FIGS. 8 and 9, SSD 420 generates driving power mode P_mode autonomously without control by host 410. SSD 420 may be operated based on a residual power amount of a power source. In information processing system 400 as a mobile device, the battery life and stability of a system can be increased by operating SSD 420 in consideration of power usage.

Figure 10:
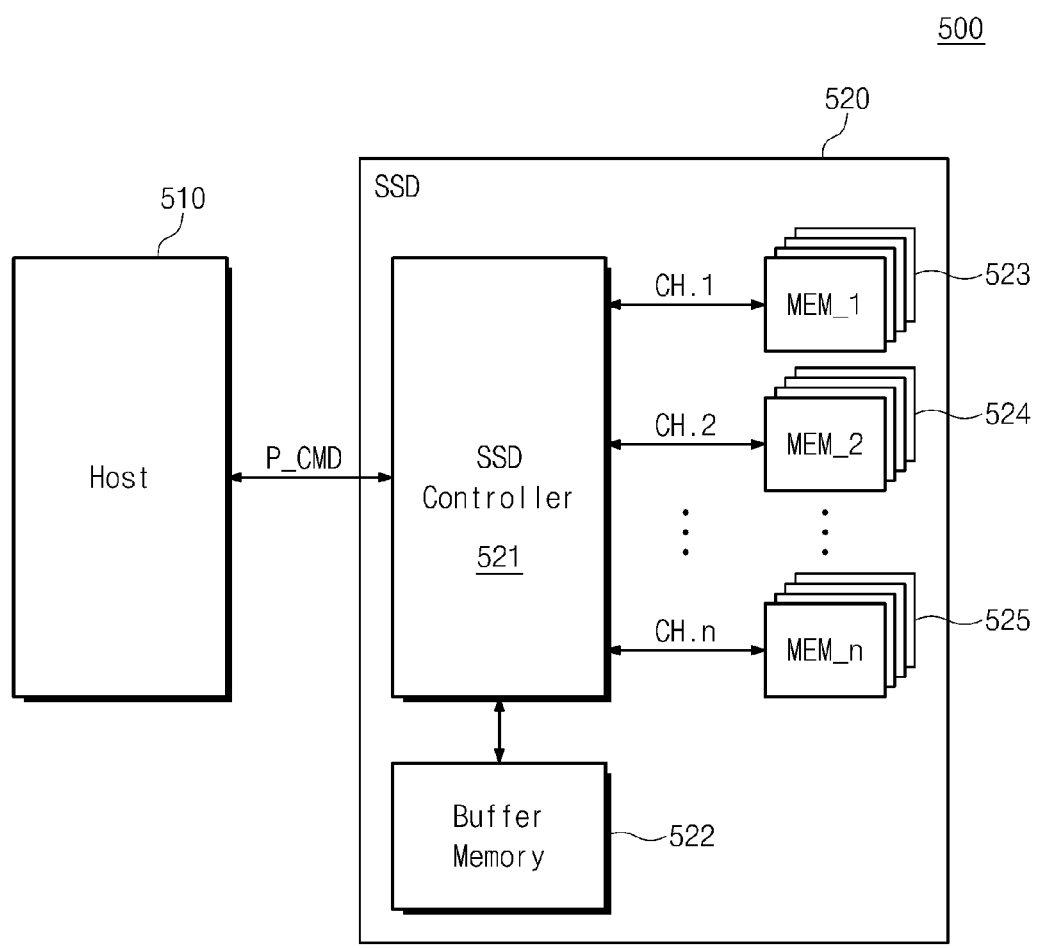
FIG. 10 is a block diagram illustrating an information processing system according to still another embodiment of the inventive concept.

FIG. 10 is a block diagram illustrating an information processing system 500 according to another embodiment of the inventive concept.

Referring to FIG. 10, information processing system 500 comprises a host 510 and an SSD 520. SSD 520 exchanges data with host 510 through an input/output port. SSD 520 stores or reads data in/from memory device groups 523 through 525 in response to a reading/writing request from host 510.

Host 510 can make an access request to SSD 520 by providing a command P_CMD and an address to SSD 520. The command may comprise, for instance, a read or write command, a driving power mode or other power-related data, or a performance specification for SSD 520. Host 510 may generate command P_CMD based on the power source state of information processing system 500. For example, host 510 may generate command P_CMD based on the residual amount of power in a battery used to drive information processing system 500. In response to command P_CMD, SSD 520 may be driven with high performance or low performance based on the residual power amount.

SSD controller 521 provides a physical connection between host 510 and SSD 520 and interfaces with SSD 520 according to a bus format of host 510. SSD controller 521 also decodes command P_CMD provided from host 510 and accesses memory device groups 523 through 525 in any one of a plurality of access modes according to the decoded result.

SSD controller 521 may also vary a clock frequency for exchanging data with buffer memory 522.

Buffer memory 522 temporarily stores writing data provided from host 510 or data read from a nonvolatile memory. Where data from memory device groups 523 through 525 is cached in buffer memory 522, host 510 may access the cached data in a read operation without directly accessing memory device groups 523 through 525.

In some embodiments, host 510 transmits data at a higher rate than channels CH.1 through CH.n within SSD 520. Accordingly, buffer memory 522 may store large amounts of data (e.g., for caching) to minimize performance degradation due to the different transmission rates. In general, buffer memory 522 may comprise an SDRAM or any of various other types of memory.

Memory device groups 523 through 525 each comprise multiple memory devices. Collectively, these devices form main storage medium of SSD 520. The memory devices in memory device groups 523 through 525 may comprise, for instance, NAND flash memory devices, DRAM, and/or SRAM.

Each of memory device groups 523 through 525 is connected to SSD controller 521 via a corresponding one of channels CH.1 through CH.n. The memory devices within each of memory device groups 523 through 525 share the corresponding channel among channels CH.1 through CH.n. In the description that follows, it will be assumed that the memory devices in memory device groups 523 through 525 are NAND flash memory devices. However, one of more of the memory devices could be substituted or supplemented with other types of memory, such as PRAM, MRAM, RRAM, FRAM and NOR flash memory.

As indicated above, information processing system 500 comprises host 510 that generates command P_CMD based on the state of a power source when an access request to SSD 520 occurs. Information processing system 500 further comprises SSD 520 that decodes command P_CMD from host 510 and accesses buffer memory 522 or devices in memory device groups 523 through 525 in an operation mode corresponding to performance information. Accordingly, information processing system 500 may control the performance of SSD 520 using a command from host 510. In particular, by varying the performance of SSD 520 based on a residual power amount of power in a power source such as a battery, the instant power consumption of SSD 520 can be controlled.

Figure 11:
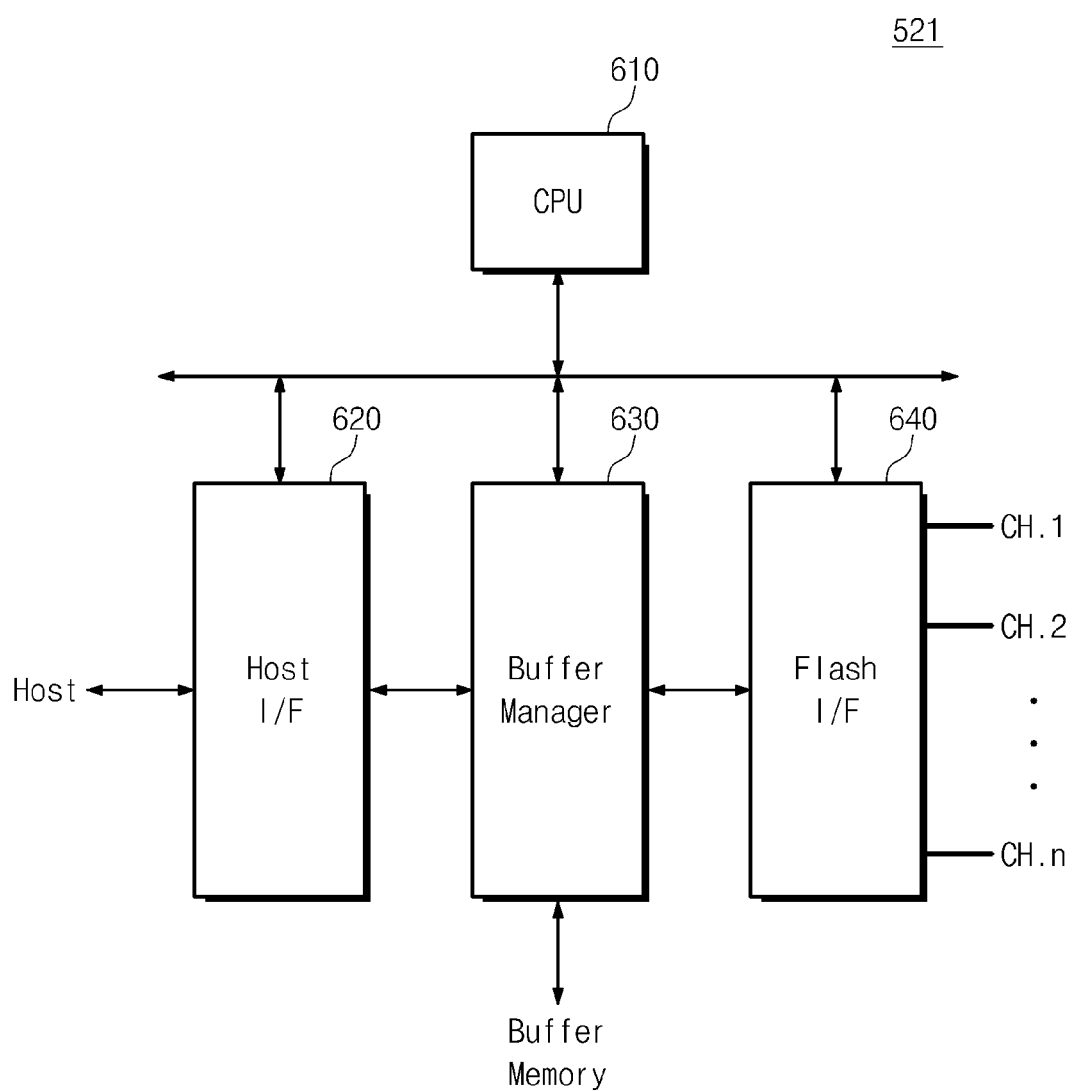
FIG. 11 is a block diagram illustrating an embodiment of an SSD controller in FIG. 10.

FIG. 11 is a block diagram illustrating an embodiment of SSD controller 521 in FIG. 10. In this embodiment, SSD controller 521 comprises a CPU 610, a host interface 620, a buffer manager 630 and a flash interface 640.

CPU 610 decodes command P_CMD received from host 510 and configures operating parameters of SSD 520 based on information in command P_CMD. Under these operating parameters, CPU 610 controls buffer manager 630 or flash interface 640 to perform accesses commands included in command P_CMD, such as reading or writing commands.

CPU 610 can generate arbitrary commands by setting different values in control registers (not shown) in flash interface 640 or host interface 620. CPU 610 can also transfer control information for reading and writing operations to registers of flash interface 640 and host 110. CPU 610 typically stores the received command P_CMD in a register of host interface 620.

Host interface 620 receives reading and writing commands from host 510 and informs CPU 610 when such a reading or writing command is received. CPU 610 then informs flash interface 640 of the reading or writing command and controls the elements of SSD 520 to perform reading or writing operations. In some embodiments, CPU 610 controls various elements of SSD 520 through corresponding firmware.

Host interface 620 acts as a physical interface between host 510 and SSD 520 according to the bus format of host 510. The bus format can use any of several protocols, such as USB, SCSI, PCI express, ATA, PATA, SATA or SAS. Host interface 620 may also support a disk emulation function so host 510 may recognize SSD 520 as a HDD. Host interface 620 may also function as an FTL for concealing deletion operations or other details of flash memory devices in SSD 520.

Buffer manager 630 controls reading and writing operations of buffer memory 522. Buffer manager 630 temporarily stores writing data and reading data in buffer memory 522. Buffer manager 630 can adjust the frequency of the driving clock of buffer memory 522 under control of CPU 210 to control its power consumption. For instance, where buffer memory 522 comprises a volatile memory such as an SDRAM, lowering its clock frequency typically reduces its power consumption. Accordingly, buffer manager 630 may control buffer memory 522 to operate with a higher frequency where performance takes precedence over power saving, or with a lower frequency where power saving takes precedence over power saving.

Flash interface 640 exchanges data with memory device groups 523 through 525. Flash memory 640 scatters data received from buffer memory 522 to channels CH.1 through CH.n and consolidates data received from memory device groups 523 through 525 via channels 523 through 525. The consolidated data is stored in buffer memory 522.

Flash interface 640 selects an access scheme for memory device groups 523 through 525 under control of CPU 610. CPU 610 sets flash interface 640 to a driving condition corresponding to performance information included in command P_CMD. Then, the number of activated memory channels CH.1 through CH.n and the degree of interleaving of these channels are controlled. Where the performance information corresponds to a full performance mode or full power mode of SSD 520 or information processing system 500, all of the memory channels are activated, and the degree of interleaving set to a maximum amount. Alternatively, the degree of interleaving and number of activated channels may be limited to conserve power. That is, flash interface 640 may access memory devices using different performance modes or power consumption modes based on command P_CMD.

In the embodiments of FIGS. 10 and 11, SSD controller 521 can control the operation of SSD 520 based on the amount of residual power in the power source of information processing system 500. In general, there may be a tradeoff between the power consumption and performance of SSD 520. Accordingly, SSD controller 521 may be configured to balance this tradeoff, e.g., by maximizing performance when there is plenty of residual power, or by minimizing power consumption when there is a scarce amount of residual power.

Figure 12:
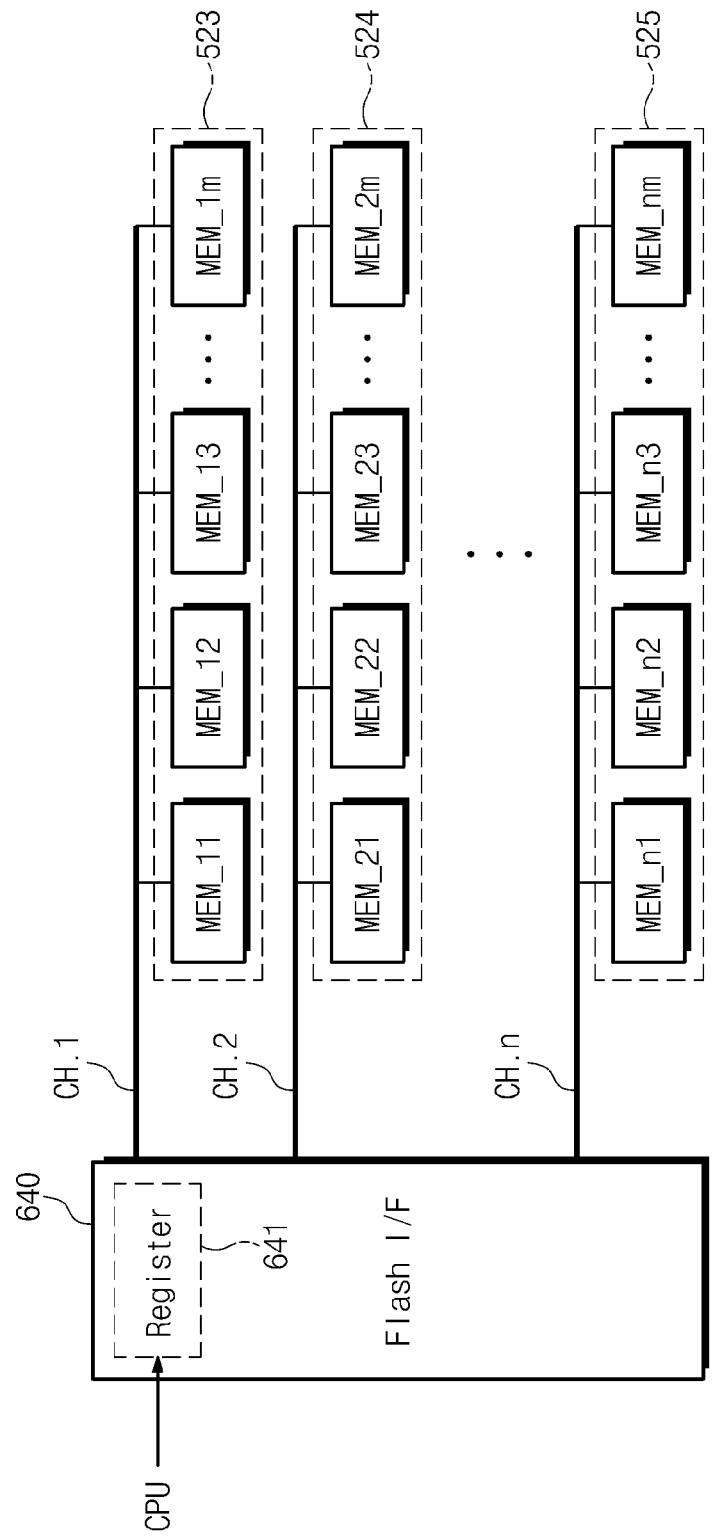
FIG. 12 is a block diagram illustrating channels and memory devices controlled by a flash interface in FIG. 11.

FIG. 12 is a block diagram illustrating channels and memory devices controlled by flash interface 640 in FIG. 11. Flash interface 640 is connected to memory device groups 523 through 525 via a plurality of channels CH.1 through CH.n.

Memory device groups 523 through 525 each comprise "m" memory devices. In particular, memory device group 523 comprises memory devices MEM_11 through MEM 1m, memory device group 524 comprises memory devices MEM_21 through MEM 2m, and memory device group 525 comprises memory devices MEM n1 through MEM nm. Each memory device in memory device groups 523 through 525 has an input/output (10) port, e.g., an 8-bit IO port.

Where command P_CMD is input to SSD 520 from host 510, CPU 610 decodes command P_CMD to stores the decoded command in register 641 of flash interface 640. Flash interface 640 limits the number of channels that are simultaneously activated among channels CH.1 through CH.n according to the command stored in register 641. Additionally, the number of memory devices that are simultaneously selected for interleaving access in different channels is also determined according to command stored in register 641. Moreover, information stored in register 641 may further include clock frequency information for exchanging data with nonvolatile memory devices.

Figures 13, 14A:
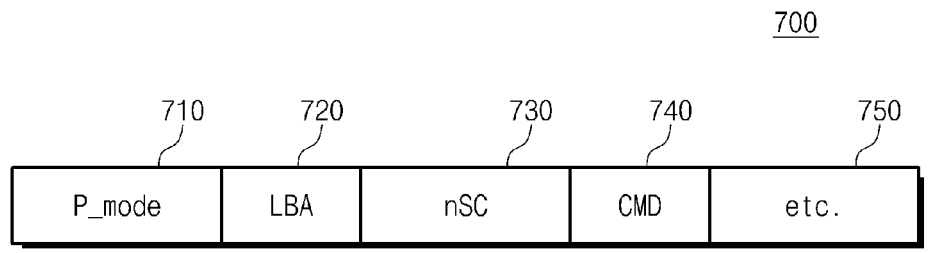

FIG. 13 is a diagram illustrating the configuration of an access command P_CMD 700 provided from host 510 to SSD 520.

Referring to FIG. 13, access command P_CMD 700 comprises a driving power mode P_mode, an address LBA 720, a number of sectors nSC 730 for defining a data size, a command CMD 740, and additional information 750. Driving power mode P_mode typically encodes information regarding the residual amount of power in the power source of host 510, and may correspond to the performance information described above with reference to FIGS. 11 and 12.

Driving power mode P_mode 710 can assume different values according to the residual power amount of the power source such as a battery. For instance, based on a measurement by host 510, the value of driving power mode P_mode may be selected to indicate high performance where the residual power amount of a battery is sufficient. On the other hand, where the residual power amount of the battery is insufficient, driving power mode P_mode may be set to minimize power consumption of SSD 520 rather than performance.

FIGS. 14A through 14C are tables illustrating different operation modes of SSD 520 based on different values of driving power mode P_mode. As demonstrated by the description of FIGS. 14A through 14C below, SSD 520 may operate in various modes based on different values of driving power mode P_mode in command P_CMD.

For explanation purposes, it will be assumed that flash interface 640 comprises eight channels CH.1 through CH.8 and the IO ports of eight memory devices are shared by each of the channels. In other words, it is assumed that flash interface 640 controls memory devices in an 8 channel bandwidth/ 8-way interleaving (8CH/8Way) scheme. The degree of interleaving (8-way in this example) indicates the number of memory devices sharing a channel.

In the example of FIG. 14A, driving power mode P_mode has a 3-bit size. Where driving power mode P_mode is '000', SSD 520 activates eight channels and uses eight way interleaving. In this case, memory devices are accessed in a full power mode for providing high performance. Accordingly, the power consumption of SSD 520 may reach a maximum value.

Where driving power mode P_mode is '001', SSD 520 activates four channels and uses four way interleaving to manage memory devices in a half power mode. Where driving power mode P_mode is '010', SSD 520 activates two channels and uses two way interleaving to manage memory devices in a quarter power mode. Where driving power mode P_mode is '011', SSD 520 activates one channel and uses one way interleaving to manage memory devices in the minimum power mode.

The values '100', '101', '110' and '111' of driving power mode P_mode may be used as reserved bits for providing additional features or setting additional modes of SSD 520. Four driving power modes P_mode may have been described above by way of example, but other driving power modes may be used in alternative embodiments of the inventive concept.

FIG. 14B is table illustrating an embodiment of driving power mode P_mode with additional values compared with the example of FIG. 14A.

Referring to FIG. 14B, driving power mode P_mode has a 4-bit size, and thus is capable of defining sixteen different operating modes for SSD 520. Where a reading command is provided to SSD 520, any one of the sixteen driving power modes included with the reading command according to the state of a power source of information processing system 500. For example, where the residual power amount of a power source detected by host 510 is sufficient for a full power mode P0, host 510 provides driving power mode P_mode with the value '0000' when providing the reading or writing command. In response to this value of power driving mode P_mode, SSD 520 activates eight channels using 8-way interleaving and manages memory devices in a full power mode for providing high performance.

Where the residual power amount is below a certain level, host 510 may provide driving power mode P_mode with a value '1111' to operate SSD 520 with minimum power consumption and minimum performance. In response to this value of power driving mode P_mode, only one channel of SSD 520 is activated, and interleaving is not used in the activated memory channel. Although not described in detail, the performance and power consumption of SSD 520 can be modified to various intermediate levels corresponding to values of power driving mode P_mode between '0000' and '1111'.

FIG. 14C is a table illustrating an embodiment of driving power mode P_mode in which a driving clock frequency of SSD 520 is varied.

Referring to FIG. 14C, the frequency $f_o$ of a driving clock CLK within SSD 520 is varied based on the value of driving power mode P_mode. In certain embodiments, driving clock CLK is the operation clock signal of buffer memory 522, CPU 610, or flash interface 640. In some embodiments, driving clock CLK is provided as a writing enable signal /WE or a reading enable signal /OE provided to a memory device through flash interface 640.

Where an MSB value of driving power mode P_mode is '0', the driving clocks CLK are operated with frequency $f_o$ and a channel/interleaving scheme is determined according to a 2-bit value of power mode P_mode other than the MSB value. For instance, where the value of driving power mode P_mode is '000', nonvolatile memory devices are accessed using an 8CH/8Way scheme (PM0) with frequencies $f_o$. Where the value of driving power mode P_mode is '001', memory devices are accessed using a 4CH/4Way scheme (PM1) with frequencies $f_o$. Where the value of driving power mode P_mode is '010', memory devices are accessed using a 2CH/2Way scheme (PM2) with frequencies $f_o$. Where the value of driving power mode P_mode is '011', memory devices are accessed using a 1CH/1Way scheme (PM2) with frequencies $f_o$.

On the other hand, where the MSB value among the 3-bit driving power mode P_mode is '1', a driving clock CLK is provided with frequencies $f_o/2$. Where the value of driving power mode P_mode is '100', memory devices are accessed using an 8CH/8Way scheme (PM0') with frequencies $f_o/2$. Where the value of driving power mode P_mode is '101', memory devices are accessed using a 4CH/4Way scheme (PM1') with frequencies $f_o/2$. Where the value of driving power mode P_mode is '110', memory devices are accessed using a 2CH/2Way scheme (PM2') with frequencies $f_o/2$. Where the value of driving power mode P_mode is '111', SSD 120 is driven in the minimum power mode. That is, memory devices are accessed through a 1CH/1Way scheme (PM3') with frequencies $f_o/2$.

Figure 15B:
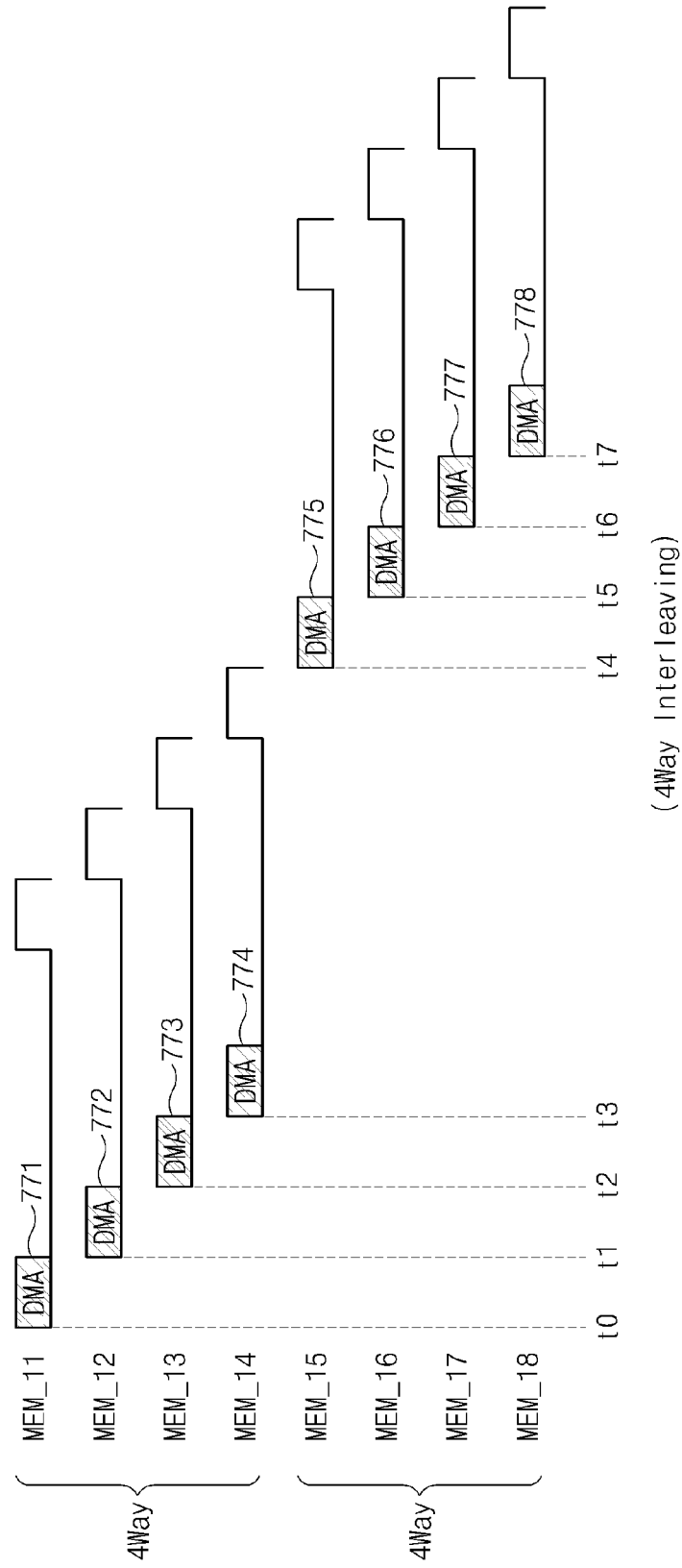
Figure 15C:
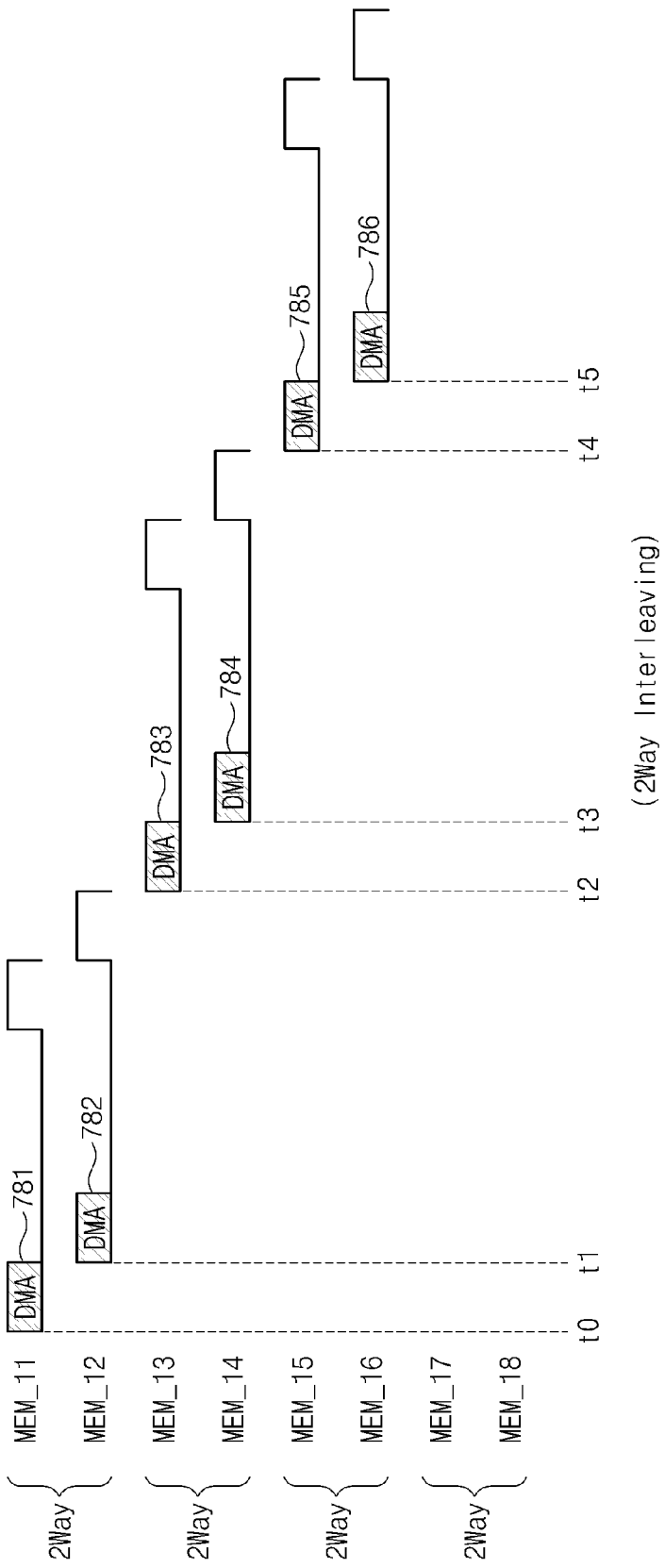
Figure 15D:
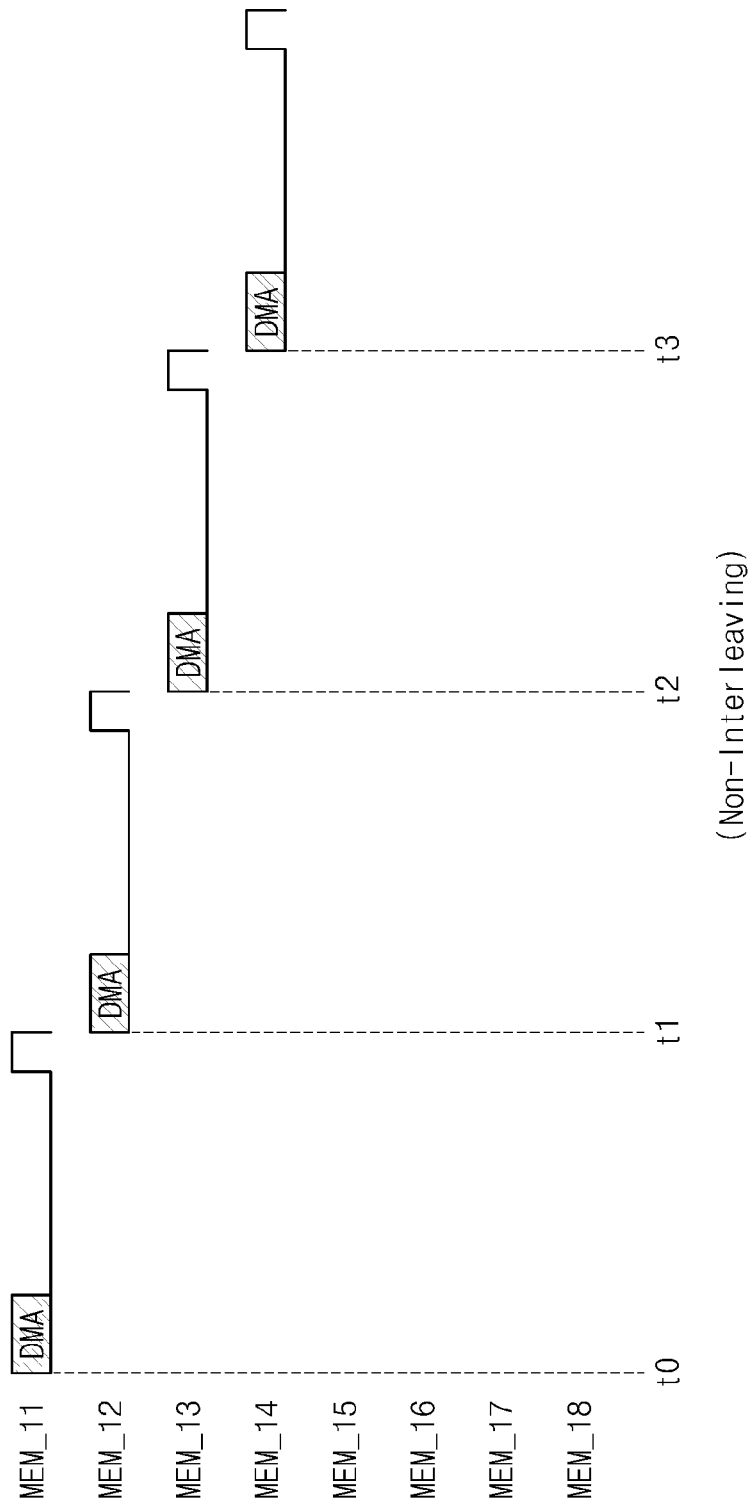

FIGS. 15A through 15C are timing diagrams illustrating interleaving access schemes of memory devices connected to the same channel according to the value of driving power mode P_mode. In particular, FIG. 15A illustrates an 8-way interleaving scheme, FIG. 15B illustrates a 4-way interleaving scheme, and FIG. 15C illustrates a 2-way interleaving scheme. FIG. 15D illustrates an access method with no interleaving.

Referring to FIG. 15A, eight memory devices MEM_11 through MEM_18 sharing an input/output port are connected to one channel (i.e., channel CH.1). In this example, SSD 520 receives driving power mode P_mode from host 510 to perform a writing operation using an 8-way interleaving scheme. To write data in memory device MEM_11, write data is provided from buffer memory 522 to memory device MEM_11 using a DMA operation.

A DMA interval tDMA is the time taken to transmit write data (for example, 4 Kbytes or 16 Kbytes) to memory device MEM_11 and other memory devices using a DMA operation. Program interval tPROG is the time required for write data provided to memory device MEM_11 to be programmed in the cell array of memory device MEM_11. The level of a ready/busy pin RnB of memory device MEM_11 maintains a logic level 'L' for program interval tPROG while the write data is programmed in a cell array. The level of ready/busy pin RnB of memory device MEM_11 is changed to a logic level 'H' after all the writing data is programmed in the cell array.

Interleaving is typically associated with a temporal overlap between program operations of different memory devices connected to the same channel. In the embodiment of FIG. 15A, as soon as a DMA operation 761 for a memory device MEM_11 is completed, a DMA operation 762 for a memory device MEM_12 is started. Thus, there is an overlap between the program interval tPROG of different memory devices connected to the same channel. 8-way interleaving denotes an operating mode of SSD 520 where a DMA operation is successively performed on eight memory devices connected to the same channel such that there is an overlap between the program interval tPROG of the corresponding program operations.

In the embodiment of FIG. 15A, 8-way interleaving constitutes a maximum access mode and contributes to high performance but requires a relatively large amount of power. The overlap between program operations for a single channel is indicated in FIG. 15A by a shaded region tPmax. Because a relatively large amount of power is required to simultaneously program all of the memory devices connected to the same channel, 8-way interleaving is typically used where there is a relatively high amount of residual power supply in information processing system 500.

FIG. 15B is a timing diagram illustrating an embodiment of the inventive concept using 4-way interleaving in a writing operation.

Referring to FIG. 15B, memory devices MEM_11 through MEM_14 sharing channel CH.1 form a first interleaving unit, and memory devices MEM_15 through MEM_18 form a second interleaving unit. The memory devices of the first interleaving unit are programmed using 4-way interleaving, and the memory devices of the second interleaving unit are then programmed using 4-way interleaving. Accordingly, only four memory devices are simultaneously programmed, which reduces instantaneous power consumption by information processing system 500.

FIG. 15C is a timing diagram illustrating an embodiment of the inventive concept which applies 2-way interleaving in a writing operation.

Referring to FIG. 15C, two memory devices MEM_11 through MEM_12 sharing channel CH.1 constitute a first interleaving unit. Two memory devices MEM_13 through MEM_14 constitute a second interleaving unit. Two memory devices MEM_15 through MEM_16 constitute a third interleaving unit. Two memory devices MEM_17 through MEM_18 constitute a fourth interleaving unit. The memory devices of the first interleaving unit are programmed using 2-way interleaving, followed by the memory devices of the second interleaving unit, the third interleaving unit, and then the fourth interleaving unit. Accordingly, only two memory devices are simultaneously programmed, which reduces instantaneous power consumption by information processing system 500.

In FIG. 15D, the memory devices connected to the same channel are programmed without interleaving. Thus, each memory device waits until programming of a previous memory device completes before starting. This non-interleaving scheme tends to reduce power consumption of information processing system 500, but decreases its performance.

FIG. 16 is a timing diagram illustrating an embodiment of the inventive concept in which frequency clock signals described above with reference to the table in FIG. 14C are varied. In FIG. 16, the clock signals are provided to flash interface 640 and used to generate a writing enable signal /WE or an output enable signal /OE for memory devices connected to different channels of SSD 520. The frequency of the clock signals provided to flash interface 640 determines the access speed of the memory devices. In particular, the frequency of a clock signal provided to flash interface 640 determines the input speed of a writing data loaded into each memory device in a DMA operation.

In the case of a clock frequency $f_o$ corresponding to a default value, the input time of a writing data by a DMA operation corresponds to a time section "t0-t1" in a DMA 791. On the other hand, where a clock frequency $f_o/2$ is provided, the input time of the writing data by the DMA operation increases by approximately two times to a time section "t0-t2" in a DMA 794. Generally, power consumption is proportional to the square of the frequency of a clock. Accordingly, by varying the frequency of a driving clock, power consumption may be decreased.

In the above description of FIG. 16, only the frequency of a clock signal provided to flash interface 640 is described. However, the frequencies of other clock signals can be varied to change the power consumption of SSD 520. For instance, the frequency of the driving clock of buffer memory 522 may be varied, or the frequency (for example, a CPU clock) of the driving clock of SSD controller 521 may be varied.

Figure 17:
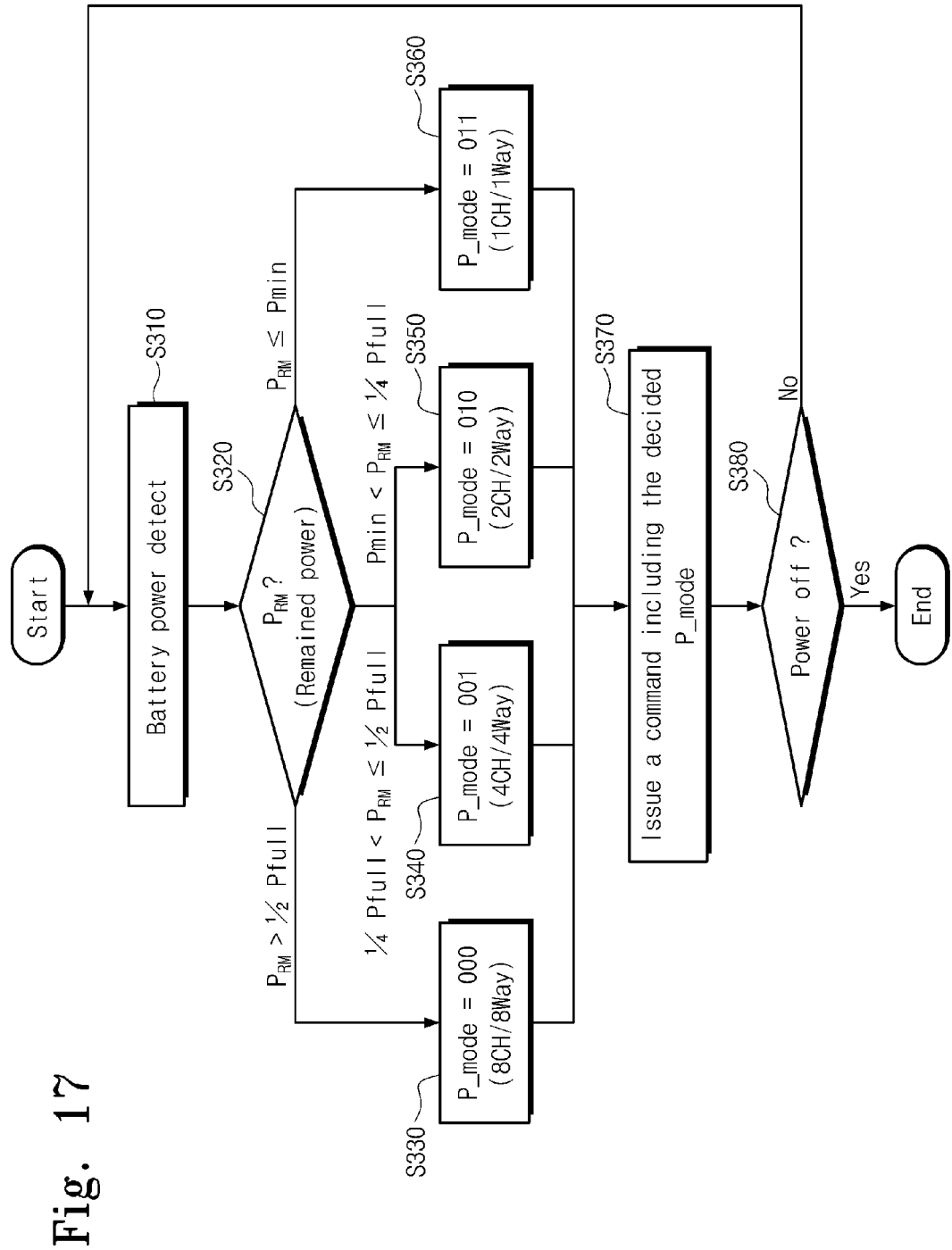
FIG. 17 is a flow chart illustrating the operation of an information processing system according to an embodiment of the inventive concept.

FIG. 17 is a flow chart illustrating a method of operating information processing system 500 according to another embodiment of the inventive concept.

Referring to FIG. 17, information processing system 500 detects the residual power of a power source such as a battery, and generates a command P_CMD for SSD 520 based on the result of the detection. Command P_CMD comprises a decoded driving power mode P_mode for performing a command CMD.

Host 510 detects the amount of the residual power "$P_{RM}$" of a battery (S310). Host 510 then determines a driving power mode P_mode, which is included in command P_CMD, according to the amount of the residual power "$P_{RM}$" (S320).

Where the residual power "$P_{RM}$" is greater than half of the maximum power "Pfull" (i.e., $P_{RM} > \frac{1}{2}Pfull$), host 510 sets driving power mode P_mode included in command P_CMD to '000'. Then, memory devices are accessed in an 8CH/8Way mode for providing full performance (S330).

Where ¼Pfull<$P_{RM}$<½Pfull, host 510 sets driving power mode P_mode included in command P_CMD to '001'. Then, the memory devices are accessed in a half power mode using a 4CH/4Way scheme (S340).

Where the amount of the residual power "$P_{RM}$" is greater than the minimum power "Pmin" allowed and is less than quarter of a power (i.e., ¼Pfull<$P_{RM}$<½Pfull), host 510 sets driving power mode P_mode included in command P_CMD to '010'. Then, the memory devices are accessed in a power mode based on a 2CH/2Way scheme (S350).

Where the amount of the residual power "$P_{RM}$" is less than the minimum power "Pmin" (i.e., $P_{RM}$<Pmin), host 510 sets driving power mode P_mode included in command P_CMD to '011'. Then, the memory devices are accessed in the minimum power mode based on a single channel unit and non-interleaving scheme (S360).

Where driving power mode P_mode corresponding to any one of four power modes is determined, command P_CMD comprising driving power mode P_mode is provided to SSD 520 (S370).

Once an access operation corresponding to command P_CMD is completed, host 510 determines whether a power off operation of the power source is requested (S380). Where the power off operation of the power source is requested, the method completes. Where the power off operation is not requested, the method of FIG. 17 is repeated.

Figure 18:
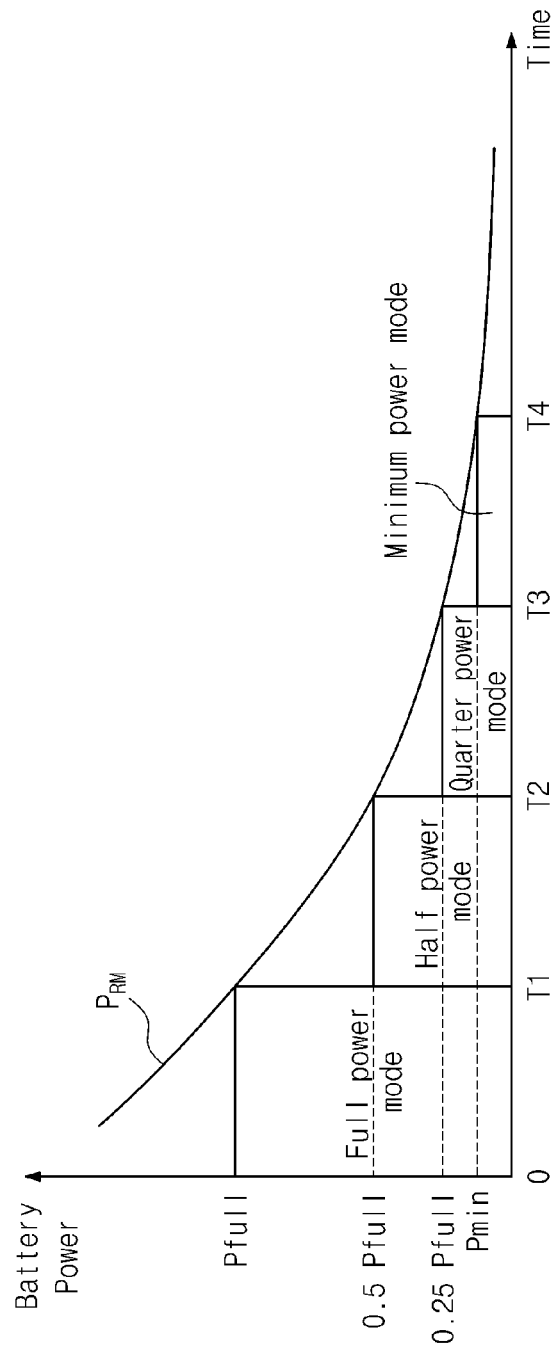
FIG. 18 is a graph illustrating a method for controlling power consumption of a data storage device according to an embodiment of the inventive concept.

FIG. 18 is a graph illustrating power modes used in the operation of SSD 520 according to residual power "$P_{RM}$".

Referring to FIG. 18, where residual power "$P_{RM}$" is greater than half of the maximum power "Pfull" (i.e., $P_{RM}$>0.5Pfull) in time "0-T1", host 510 provides driving power mode P_mode as a full power mode (for example, '000'). In the full power mode, SSD 520 accesses memory devices with high performance, e.g., using an 8CH/8Way scheme.

Where 0.25Pfull<$P_{RM}$<0.5Pfull in time "T1-T2", host 510 sets driving power mode P_mode in command P_CMD as a half power mode (for example, '001'). In the half power mode, SSD 520 accesses memory devices in with a channel/interleaving scheme such as a 4CH/4Way scheme.

Where Pmin<$P_{RM}$<0.25Pfull, host 510 sets driving power mode P_mode included in a command P_CMD as a quarter power mode (for example, '010'). In the quarter power mode, SSD 520 accesses memory devices in a power mode based on a 2CH/2Way scheme.

Where the amount of the residual power "$P_{RM}$" is less than the minimum power "Pmin" (i.e., $P_{RM}$<Pmin), host 510 sets driving power mode P_mode included in command P_CMD as the minimum power mode. In the minimum power mode, SSD 520 accesses the memory devices in the minimum power mode based on a single channel unit or non-interleaving scheme.

The driving of SSD 520 in consideration of a residual power may be performed by providing driving power mode P_mode in the access command of host 510. In information processing systems such as mobile devices, battery life may be extended by using different driving modes for SSD 520 in consideration of remaining power.

Figure 19:
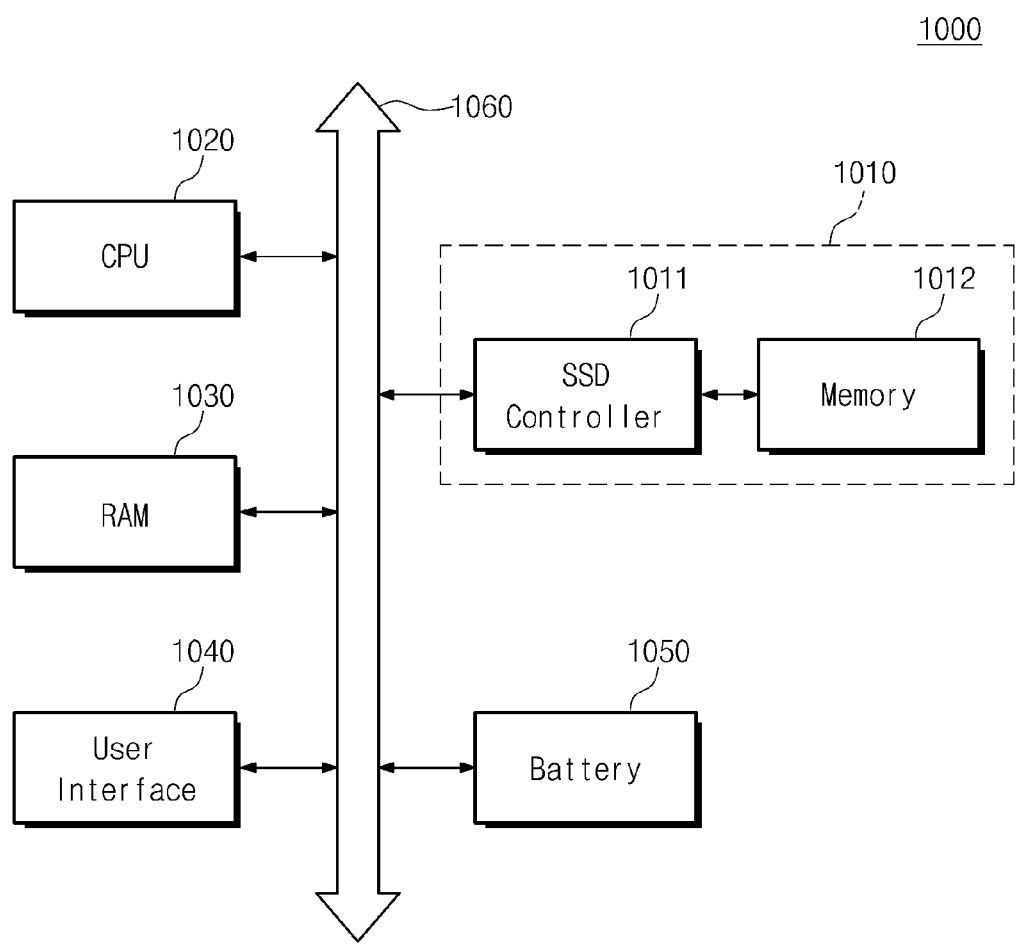
FIG. 19 is a block diagram illustrating a computing system incorporating a data storage device according to an embodiment of the inventive concept.

FIG. 19 illustrates a computing system 1000 comprising an SSD according to an embodiment of the inventive concept.

Referring to FIG. 19, a computing system 1000 comprises a microprocessor 1020 electrically connected to a system bus 1060, a RAM 1030, a user interface 1040, a battery 1050, and an SSD 1010. SSD 1010 comprises an SSD controller 1011, and a memory device 1012.

N-bit data (N≧1), which has been processed or is to be processed by microprocessor 1020, is stored in memory device 1012 through SSD controller 1011. Although not shown, computing system 1000 may further comprise an application chipset, a camera image processor (CIS), a modem and a mobile DRAM. Using one or more commands, computing system 1000 can control SSD 1010 to drive at different driving power levels in consideration of the residual power of battery 1050. SSD 1010 can comprise a nonvolatile memory device and can be incorporated in a variety of devices, such as a multimedia card (MMC), a Secure Digital (SD) card, a micro SD card, a memory stick, an identifier (ID) card, a PCMCIA card, a chip card, a USB card, a smart card, or a compact flash (CF) card.

In some embodiments, computing system 1000 is implemented as a portable device, such as a cellular phone, PDA digital camera, portable console, or MP3 player. In these and other embodiments, memory device 1012 may be used to store various types of data, including as nonfunctional data or functional data such as code. In some embodiments, computing system 1000 is implemented in a home application such as high definition television (HDTV), digital video disk (DVD), a router, or global positioning system (GPS).

In some embodiments, computing system 1000 is implemented as an embedded system, which may comprise, for instance, a CPU, an OS, and an application designed to perform one or more specific tasks. An embedded system can be embedded in a variety of settings, such as household equipment, military or industrial equipment, communication equipment, set-top boxes, digital televisions (DTV) and digital cameras.

In some embodiments of computing system 1000, the driving power mode of SSD 1010 may be selected by a BIOS setting programmed by a user through user interface 1040. The setting can then be transmitted to SSD 1010 in the form of a vendor specific command VS_CMD generated by CPU 1020 based on BIOS configuration data. Then, SSD 1010 can set or adjust internal operating parameters based on vendor specific command VS_CMD.

In some embodiments of computing system 1000, SSD 1010 may autonomously sense power data and generate a driving power mode without receiving an external command such as vendor specific command VS_CMD. The internal operating parameters of SSD 1010 may be adjusted or set according to the generated driving power mode. The performance or instantaneous power consumption of SSD 1010 may be controlled in consideration of the residual power amount of battery 1050.

The memory devices and/or SSD controllers according to selected embodiments of the inventive concept may be mounted in various types of packages. For example, the memory devices and/or SSD controllers may be mounted in packages with configurations such as package on package (PoP), ball grid arrays (BGAs), chip scale packages (CSPs), plastic leaded chip carrier (PLCC), plastic dual in-line package (PDIP), die in waffle pack (DIWP), die in wafer form (DIWF), chip on board (COB), ceramic dual in-line package (CERDIP), plastic metric quad flat pack (MQFP), thin quad flat pack (TQFP), small outline package (SOP), shrink small outline package (SSOP), thin small outline package (TSOP), thin quad flat pack (TQFP), system in package (SIP), multi chip package (MCP), wafer level stack package (WLSP), die in wafer form (DIWF), die on waffle package (DOWP), wafer-level fabricated package (WFP) and wafer-level processed stack package (WSP).

In certain embodiments, the driving power mode of an SSD can be adjusted based on BIOS configuration information, or based on a residual amount of power in a power source such as a battery. Such adjustments can be used, for instance, to prolong battery life in a portable device or decrease power consumption in a variety of other devices.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A storage device operating under the control of a host, the storage device, comprising:
   a plurality of memory devices; and
   a memory controller that exchanges data with the memory devices via a plurality of channels, decodes a command received from the host to determine a driving power mode, activates at least two activated channels among the plurality of channels according to the driving power in order to access the memory devices, and adjusts a degree of interleaving between the at least two activated channels according to the driving power mode.

2. A data storage device operating under control of a host, the storage device comprising:
   a plurality of memory devices; and
   a memory controller that receives from a basic input/output system (BIOS) of the host a vendor specific command indicating a driving power mode that controls configuration of the memory devices, such that the memory controller exchanges data with the memory devices via a plurality of channels according to the command and the command adjusts at least one of a degree of interleaving among the plurality of channels, and a number of activated channels among the plurality of channels.

3. The data storage device of claim 2, wherein the power driving mode is defined at least in part by a residual power amount provided by a power source powering the storage device.

4. The data storage device of claim 3, wherein the memory controller respectively adjusts access start times of the activated channels according to the driving power mode.

5. The data storage device of claim 2, further comprising a buffer memory that buffers data received from the host under control of the memory controller;
   wherein the memory controller adjusts a frequency of a clock driving the buffer memory according to the driving power mode.

6. The data storage device of claim 2, wherein the memory controller comprises a central processing unit that decodes the command, and a frequency of a clock controlling the central processing unit is adjusted according to the command.

7. The data storage device of claim 2, wherein the memory controller adjusts both the degree of interleaving among the plurality of channels, and the number of activated channel among the plurality of channels according to the command.

8. The data storage device of claim 2, wherein each of one of the plurality of memory devices is a flash memory device, and the plurality of memory devices and the memory controller are operatively arranged to form a solid state drive.

9. A data storage device operating under control of a host, the storage device comprising:
   a plurality of memory devices; and
   a memory controller that receives from a basic input/output system (BIOS) of the host a vendor specific command indicating a driving power mode that controls configuration of the memory devices, such that the memory controller exchanges data with the memory devices via a plurality of channels according to the command and the command adjusts a degree of interleaving among the plurality of channels.

* * * * *